(12) United States Patent
Hughes et al.

(10) Patent No.: US 8,204,779 B1
(45) Date of Patent: *Jun. 19, 2012

(54) REVENUE ASSET HIGH PERFORMANCE CAPABILITY ASSESSMENT

(75) Inventors: Roderick R. Hughes, Indianapolis, IN (US); Christine E. Denzer, Indianapolis, IN (US); Ruth A. Kennedy, Dublin (IE); Chen Ming, Shanghai (CN); Shannon N. Johnson, London (GB); David Regan, Dublin (IE); Carl Ward, Canberra (AU); Matthew A. Newman, Scottsdale, AZ (US); Peter C. Olds, Austin, TX (US); Karla J. Hulett, Fairfax, VA (US); Lucina O'Sullivan, Kildare (IE)

(73) Assignee: Accenture Global Services Limited, Dublin (IE)

( * ) Notice: Subject to any disclaimer, the term of this patent is extended or adjusted under 35 U.S.C. 154(b) by 872 days.

This patent is subject to a terminal disclaimer.

(21) Appl. No.: 12/194,793

(22) Filed: Aug. 20, 2008

(51) Int. Cl.
G06Q 99/00 (2006.01)

(52) U.S. Cl. ............ 705/7.39; 705/7.11; 705/7.12; 705/7.29; 705/7.31; 705/7.32; 705/7.33; 705/7.37; 705/7.41

(58) Field of Classification Search ............ 705/7, 7.39, 705/7.11, 7.12, 7.29, 7.31, 7.32, 7.33, 7.37, 705/7.41
See application file for complete search history.

(56) References Cited

U.S. PATENT DOCUMENTS

| | | | |
|---|---|---|---|
| 6,256,773 B1 | 7/2001 | Bowman-Amuah | |
| 6,324,647 B1 | 11/2001 | Bowman-Amuah | |
| 6,370,573 B1 | 4/2002 | Bowman-Amuah | |
| 6,601,233 B1 | 7/2003 | Underwood | |
| 6,957,186 B1 | 10/2005 | Guheen et al. | |
| 2003/0083912 A1* | 5/2003 | Covington et al. | 705/7 |
| 2003/0110067 A1 | 6/2003 | Miller et al. | |
| 2004/0098299 A1* | 5/2004 | Ligon et al. | 705/10 |

FOREIGN PATENT DOCUMENTS

WO   WO 0233581 A2 *   4/2002

OTHER PUBLICATIONS

U.S. Appl. No. 11/823,112, filed Jun. 25, 2007.
U.S. Appl. No. 12/124,010, filed May 20, 2008.
U.S. Appl. No. 12/129,080, filed May 29, 2008.
U.S. Appl. No. 61/086,927, filed Aug. 7, 2008.
U.S. Appl. No. 61/092,225, filed Aug. 27, 2008.
U.S. Appl. No. 12/324,150, filed Nov. 26, 2008.
U.S. Appl. No. 61/154,832, filed Feb. 24, 2009.
U.S. Appl. No. 61/154,945, filed Feb. 24, 2009.
U.S. Appl. No. 61/164,640, filed Mar. 30, 2009.
U.S. Appl. No. 61/164,618, filed Mar. 30, 2009.

(Continued)

*Primary Examiner* — Akiba Robinson Boyce
(74) *Attorney, Agent, or Firm* — Brinks Hofer Gilson & Lione

(57) ABSTRACT

A high performance capability assessment model helps a revenue industry agency meet the challenges of the global marketplace. As a result, the revenue industry can achieve the clarity, consistency, and well-defined execution of core processes that reduce inefficiencies and waste that result from unnecessary process complexity and exceptions. In addition, the high performance capability assessment model helps the revenue industry agency to identify specific areas in which improvements may be made and understand how to make the improvements, and establishes levels of capability along the way to reaching an ultimate capability goal.

15 Claims, 10 Drawing Sheets

OTHER PUBLICATIONS

U.S. Appl. No. 12/427,201, filed Apr. 21, 2009.
U.S. Appl. No. 12/471,767, filed May 26, 2009.
U.S. Appl. No. 12/479,310, filed Jun. 5, 2009.
U.S. Appl. No. 12/548,673, filed Aug. 27, 2009.
U.S. Appl. No. 12/701,914, filed Feb. 8, 2010.
U.S. Appl. No. 12/710,900, filed Feb. 23, 2010.
U.S. Appl. No. 12/710,662, filed Feb. 23, 2010.
U.S. Appl. No. 12/713,647, filed Feb. 26, 2010.
U.S. Appl. No. 12/713,597, filed Feb. 26, 2010.
Brochure, "High Performance Acceleration: Global Retail Process Model," Accenture, High Performance Delivered, 2007.

Handbook, Software Engineering Institute, "A Description of the Systems Engineering Capability Maturity Model Appraisal Method Version 1.1," Mar. 1996.

Keith A. Heston, "Achieving Delivery Excellence Using the Capability Maturity Model Integration," *Accenture, High Performance Delivered*, 2006.

Report, Software Engineering Institute, "A Systems Engineering Capability Maturity Model, Version 1.1.," Nov. 1995.

Walker Royce, "CMM vs. CMMI: From Conventional to Modern Software Management," *The Rational Edge*, 2002.

* cited by examiner

REVENUE ASSET HIGH PERFORMANCE CAPABILITY ASSESSMENT

BACKGROUND OF THE INVENTION

1. Technical Field

This disclosure concerns a system and method to identify the performance of an organization on a scale of mastery across representative capabilities of the organization's industry. In particular, this disclosure relates to an efficient and cost effective way to assess the performance level of key capability areas within the processes of a government revenue organization.

2. Background Information

Modern government organizations operate in an increasingly challenging environment of reduced operating budgets, resource shortfalls, and increased expectations from constituents and lawmakers. To survive, government revenue organizations must adapt to this environment and execute in a clear, consistent, and efficient manner.

Despite the need for a government revenue organization to meet the challenges of a rapidly aging workforce, decreases in operating budgets, increased complexity of tax avoidance schemes, political and economic changes, it is still often the case that the agency lacks clarity, consistency, and well-defined execution of its core processes. These shortcomings severely constrain the agency, and lead directly to inefficiencies and waste due to unnecessary complexity, process exceptions, and customer dissatisfaction. At the same time, it can be very difficult to identify specific processes to which improvements may be made, either because the agency itself does not have the expertise to identify the processes or because the complexities of the agency frustrate attempts to clearly delineate the processes to be improved.

Even if the revenue agency, on its own, could identify one of the many processes that it needs to improve, the agency would not necessarily know how to improve the process or be able to identify a concrete and measurable improvement goal. Another difficulty exists in determining whether there are any intermediate goals that should be reached along the way. As revenue agencies struggle to meet the demands of the modern economic landscape, they fail to identify opportunities for maximizing compliance, maximizing collections, minimizing the burden on taxpayers, maximizing responsiveness to stakeholders, and means of achieving cost effectiveness.

Therefore, a need exists for an efficient and effective system and method to assess the performance level of key assessment areas within the processes of an organization.

SUMMARY

A high performance capability assessment (HPCA) model helps revenue agencies meet the challenges of the global marketplace by defining a scale of performance mastery along which the current practices of the agency may be located. The HPCA model accelerates the discovery of process and performance gaps within agency operations. In addition, the HPCA model also helps the agency to identify specific areas in which improvements may be made, how to make the improvements, and how to establish performance measures during the course of attempting to achieve an ultimate goal. As a result, the agency can achieve the clarity, consistency, and well-defined execution of core processes that maximize the operating budget for optimum outcomes.

The HPCA model includes a key factor dimension and a performance mastery scale dimension. The performance mastery scale dimension defines multiple mastery levels. The performance mastery levels form a scale of increasing organizational performance. The scale includes a 'Basic' mastery level, a 'Competitive' mastery level, and a 'Market Leading' mastery level. Each performance mastery level includes criteria specific to a corresponding key assessment area. Each key assessment area identifies some aspect of a capability of an agency.

A business capability can be defined as a bundle of closely integrated skills, knowledge, technologies, and cumulative learning that are exercised through a set of processes and that collectively represent an organization's ability to create value by producing outcomes and results. Capability area does not represent a delineation of organizational responsibilities as the business outcomes of a capability may be result of a number of cross functional teams. Capabilities of an agency may be grouped into platforms. For example, the HPCA model groups the capabilities of the revenue industry into four high-level platforms, including a customer interaction platform, operations platform, enablement platform, and enterprise platform. Examples of capabilities within the customer interaction platform, for example, include customer management and channel management. Platforms may include sub-platforms, as well as capabilities. For example, the operations platform may include a risk analytics sub-platform containing the capabilities customer risk management and market risk management; a processing sub-platform containing the capabilities registration, forms & financial processing, and revenue accounting; and a compliance sub-platform containing the capabilities debt management, audit, discovery & non filer, and marketing & outreach.

The key factor dimension establishes a categorization of aspects of a capability that effectively group activities describing how a capability is delivered across the scale of performance mastery. For example the activities that agencies perform for the delivery of the capability area of customer management and the factors that should be considered are grouped into segmentation & ownership, personalization, support & assistance, performance transparency, and human resources. In addition example metrics tied to desired outcomes may be described which enable and agency to effectively measure their performance in delivering a capability area.

Other systems, methods, features, and advantages will be, or will become, apparent to one with skill in the art upon examination of the following figures and detailed description. All such additional systems, methods, features, and advantages are included within this description, are within the scope of the invention, and are protected by the following claims.

BRIEF DESCRIPTION OF THE DRAWINGS

The revenue industry performance capability assessment model and system may be better understood with reference to the following drawings and description. The elements in the figures are not necessarily to scale, emphasis instead being placed upon illustrating the principles of the capability assessment techniques. In the figures, like-referenced numerals designate corresponding parts throughout the different views.

DETAILED DESCRIPTION OF THE PREFERRED EMBODIMENTS

Figure 1:
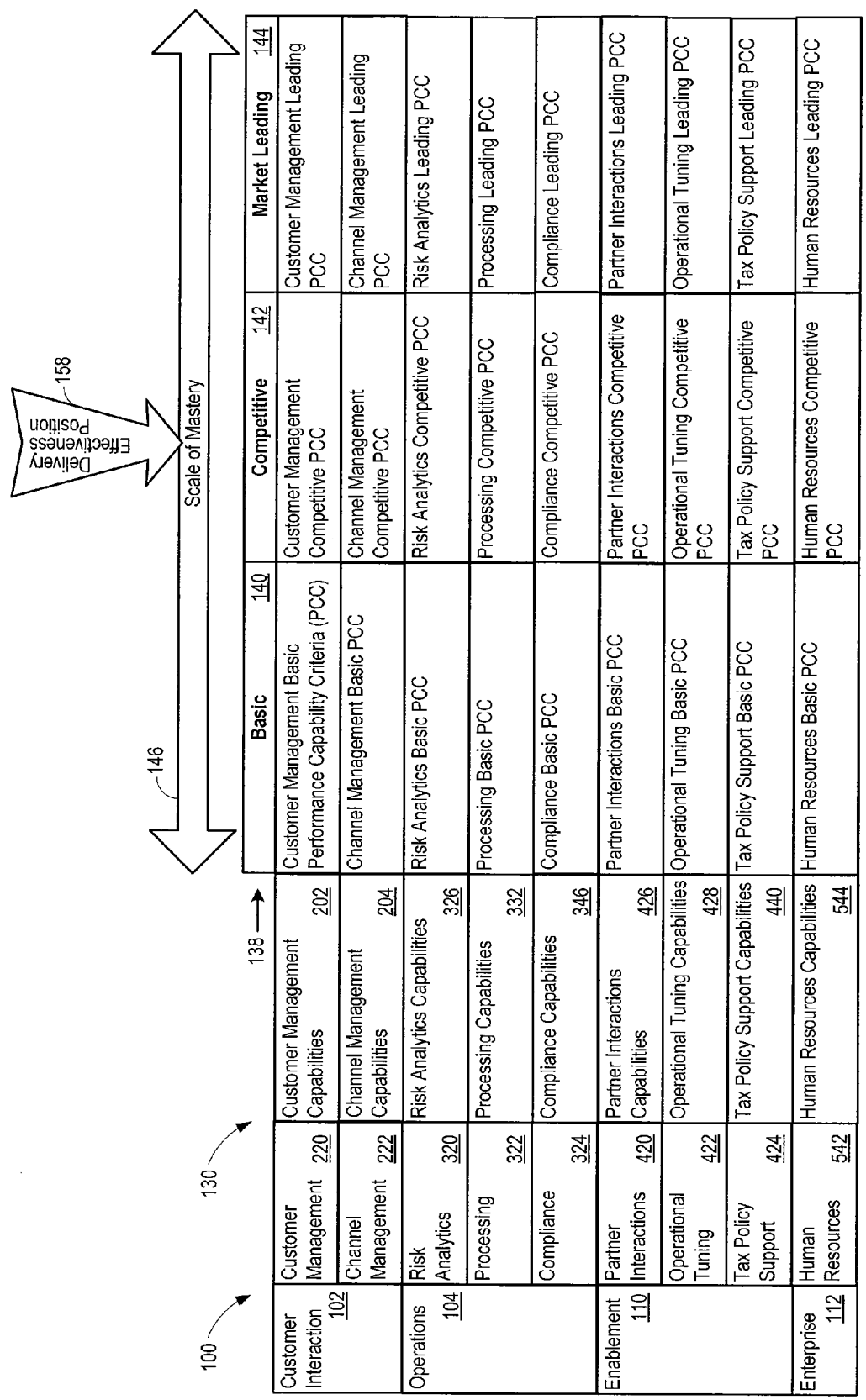
FIG. 1 shows a high performance capability assessment model with a performance scale of mastery and performance criteria shown for different capabilities.

FIG. 1 shows a high performance capability assessment (HPCA) model 100. The HPCA model 100 specifies four high-level platforms, including a customer interaction platform 102, operations platform 104, enablement platform 110, and enterprise platform 112. The HPCA model 100 is not limited to the form shown in FIG. 1. Instead, the HPCA model 100 may be adapted and modified to fill a wide variety of analysis roles. Additional, different, or fewer platforms may be used in other implementations, with each platform defining additional, different, or fewer capabilities. Each platform includes one or more multiple <platform name> capabilities 130.

The HPCA model 100 establishes a multidimensional revenue asset industry performance reference set that includes multiple key assessment performance levels 138, further described below in reference Tables 1-3. The performance levels 138 establish a scale of increasing effectiveness in delivery of each capability. The key assessment performance reference tables include a 'Basic' 140 delivery level, a 'Competitive' 142 delivery level and a 'Market Leading' 144 delivery level. The performance levels establish a scale of mastery 146 along which current agency practices may be located and identified with respect to any platform and capability within a platform according to an analysis of performance capability criteria (PCC). The capability under evaluation may be assigned the performance level 138 based on a delivery effectiveness position 158 along the scale of mastery 146.

The 'Basic' delivery level 140 specifies 'Basic' performance assessment criteria, the 'Competitive' delivery level 142 specifies 'Competitive' performance assessment criteria, and the 'Market Leading' delivery level 144 specifies 'Market Leading' performance assessment criteria. The HPCA model 100 receives input data that specifies a government revenue agency platform (e.g., a revenue asset industry area) and a revenue asset industry key assessment area for analysis. The I-IPCA model 100 searches the multidimensional government revenue industry performance reference set for a matching key assessment performance reference table that matches the government revenue agency industry platform and corresponding industry capability within the platform and the revenue asset industry key assessment area, and retrieves the matching key assessment performance reference table. The HPCA model 100 initiates analysis of the matching key assessment performance reference table to obtain a resultant performance assessment level for the revenue asset industry key assessment area.

Tables 1-3 below provide an explanation of each of the capability levels 140, 142, and 144.

TABLE 1

'Basic' Delivery Level

| Description: | Capability mastery at a basic level is indicative of a low level, unclear, undisciplined, or unsophisticated ability to execute the capability or process in a consistent, traceable, and repeatable manner. This level may be uncompetitive on a domestic and global basis. For non-core, low priority, new, or early adoption of certain process capabilities, a basic level may be acceptable to the organization or the organization may not have the resources to expand beyond the basic capability level. A basic level of mastery often indicates that an organization is lagging behind its peers in its ability to execute the capability. |
|---|---|

TABLE 2

'Competitive' Delivery Level

| Description: | Capability mastery at a competitive level is indicative of a conservative ability to execute the capability in a fairly consistent, traceable, and repeatable manner with proven techniques, tools and commonly accepted practices that are readily available and maintained. A competitive level may includes those in the top 50% of performers when compared to an international peer group. This capability mastery may be a strategic decision by the organization to be a follower or "good enough" operator in many respects or may be an interim step that organizations aspire to move beyond to achieve a leading mastery of the given capability. A competitive level of mastery often indicates that an organization is performing consistently with its competitors in its ability to execute a capability. |
|---|---|

TABLE 3

'Market Leading' Delivery Level

| Description: | Capability mastery at a market leading level is indicative of a highly detailed, clear, and often iterative and sophisticated ability to execute the capability. Few organizations perform at this level globally. The market leading capability is the recognized and referenced benchmark of continuous improvement and high performance for a given process capability. The market leading processes have been optimized for efficiency and effectiveness, are well understood, traceable, and consistently executed to the point of being competitively differentiated or at the top level of peer to peer comparison. |
|---|---|

For FIGS. 2-5, the capability under evaluation may be assigned a level of mastery 138 based on the agency's position along the scale of mastery 146 (e.g., the 'basic,' 'competitive,' or 'market leading' delivery level). Performance criteria corresponding to the basic 140, competitive 142 and market leading 144 performance levels populate the HPCA model 100. The performance criteria capture characteristics, and/or other features of the delivery of a capability at a particular performance level. Examples below illustrate performance criteria that provide analysis and benchmarking for government revenue organizations. The HPCA model 100 performance criteria provide a tool for determining where a platform and capability under examination falls along the scale of mastery 146.

For example, agency consultants and business process engineers may interview an agency or receive data about the agency to determine, measure, or otherwise ascertain the characteristics, criteria, and other features of a particular capability implemented within the agency. The consultants and engineers may compare the characteristics of the agency to the performance criteria in the HPCA model 100 and arrive at an assessment level 138 for the capability under examination. In doing so, for example, the consultants and engineers may identify where the capability under examination falls in terms of the performance level for each key assessment area of a capability and determine an overall position on the scale of mastery 146 for the capability under examination. Performance criteria may populate the HPCA model 100 in whole or in part. Multiple high performance capability assessments may be collected and stored with the performance criteria for future retrieval and possible modification in a capability detail pool, discussed below.

Figure 2:
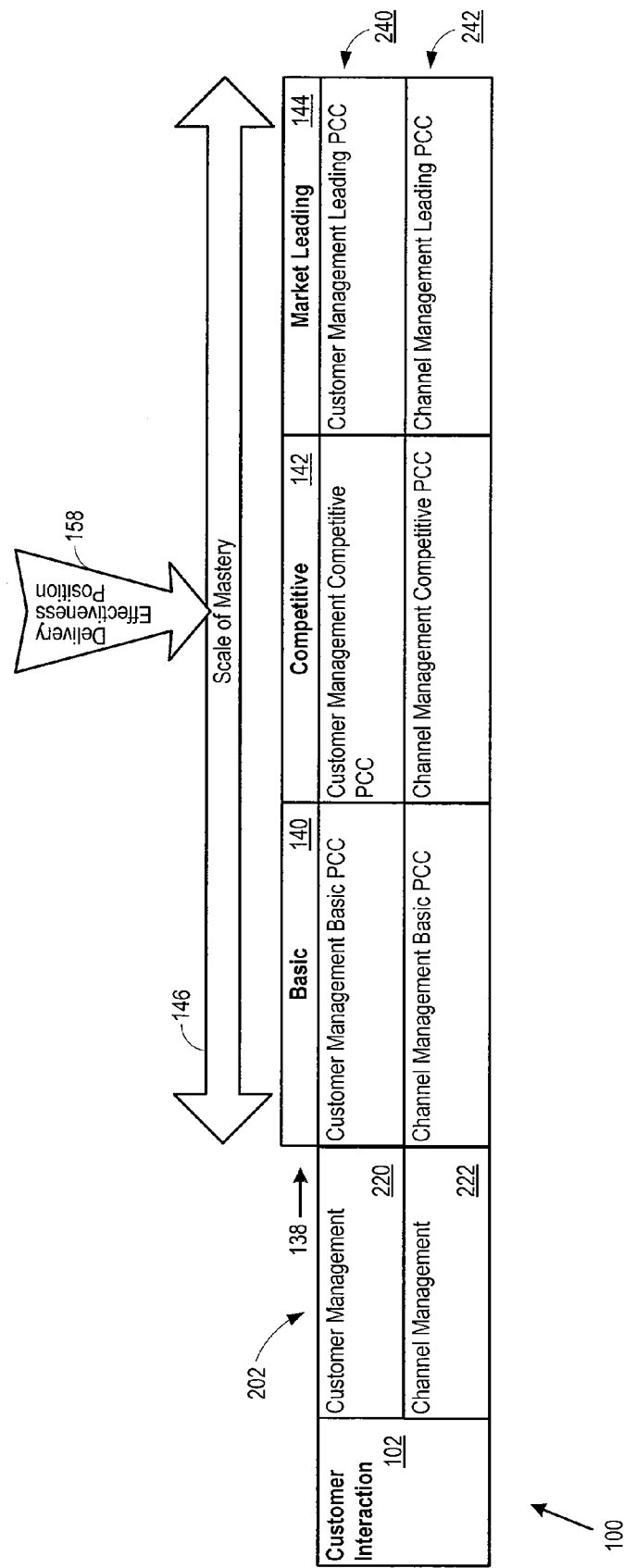
FIG. 2 shows a high performance capability assessment model with customer interaction capabilities shown.

FIG. 2 shows the customer interaction platform 102 divided into respective capability areas. The customer interaction platform 102 includes a customer management capability 220 and channel management capability 222, which correspond to multiple capabilities 240 and 242.

Figure 3:
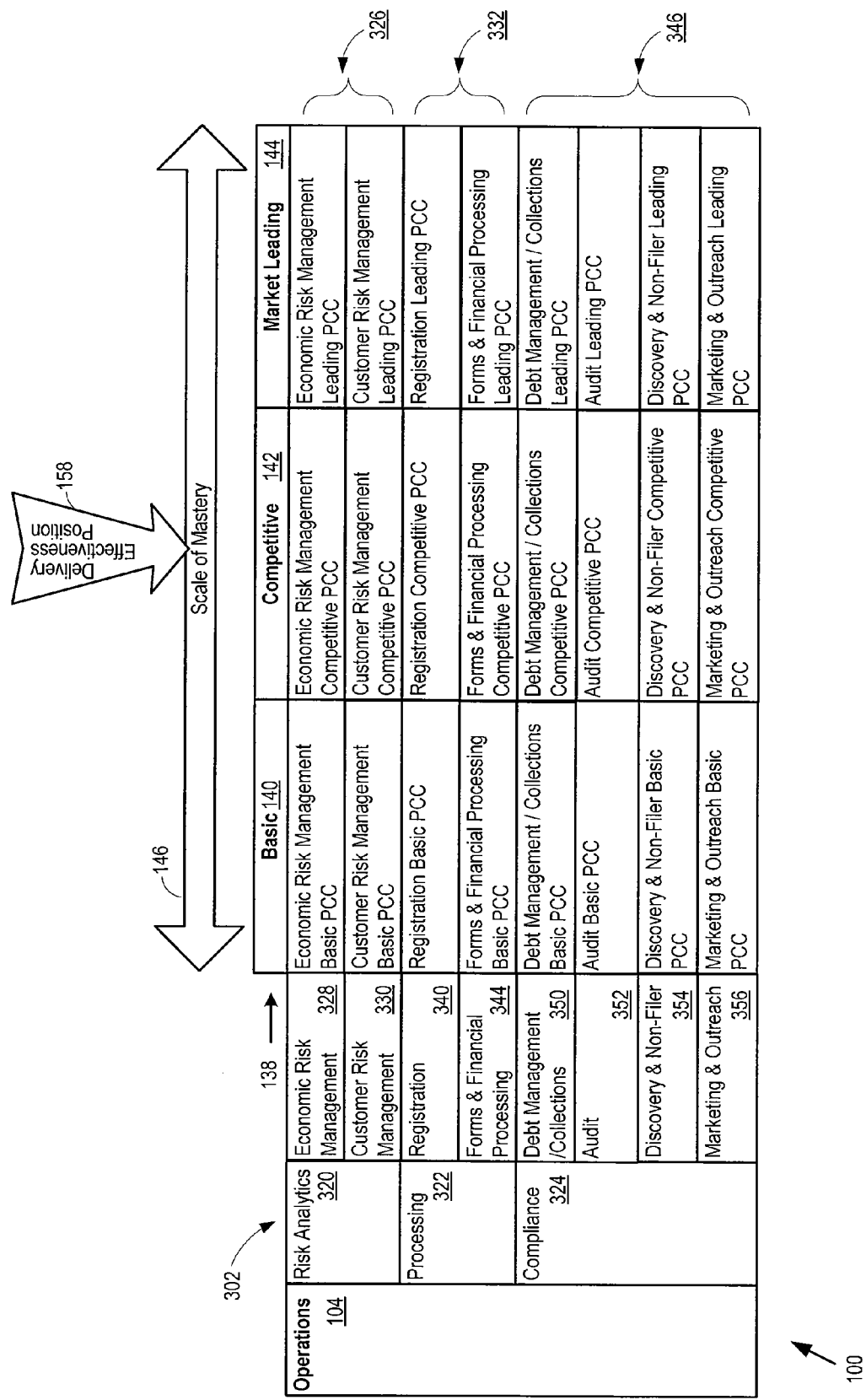
FIG. 3 shows a high performance capability assessment model with operations capabilities shown.

FIG. 3 shows the operations platform 104 divided into three sub-platforms 302, namely a risk analytics sub-platform 320, a processing sub-platform 322, and a compliance sub-platform 324. The risk analytics sub-platform 320 includes multiple capability areas 326, which include an economic risk management capability 328 and a customer risk management capability 330. The processing sub-platform 322 includes multiple capability areas 332, which include a registration capability 340 and a forms and financial processing capability 344. The compliance sub-platform 324 includes multiple capability areas 346, which include a debt management and collections capability 350, an audit capability 352, a discovery and non-filer capability 354, and a marketing and outreach capability 356.

Figure 4:
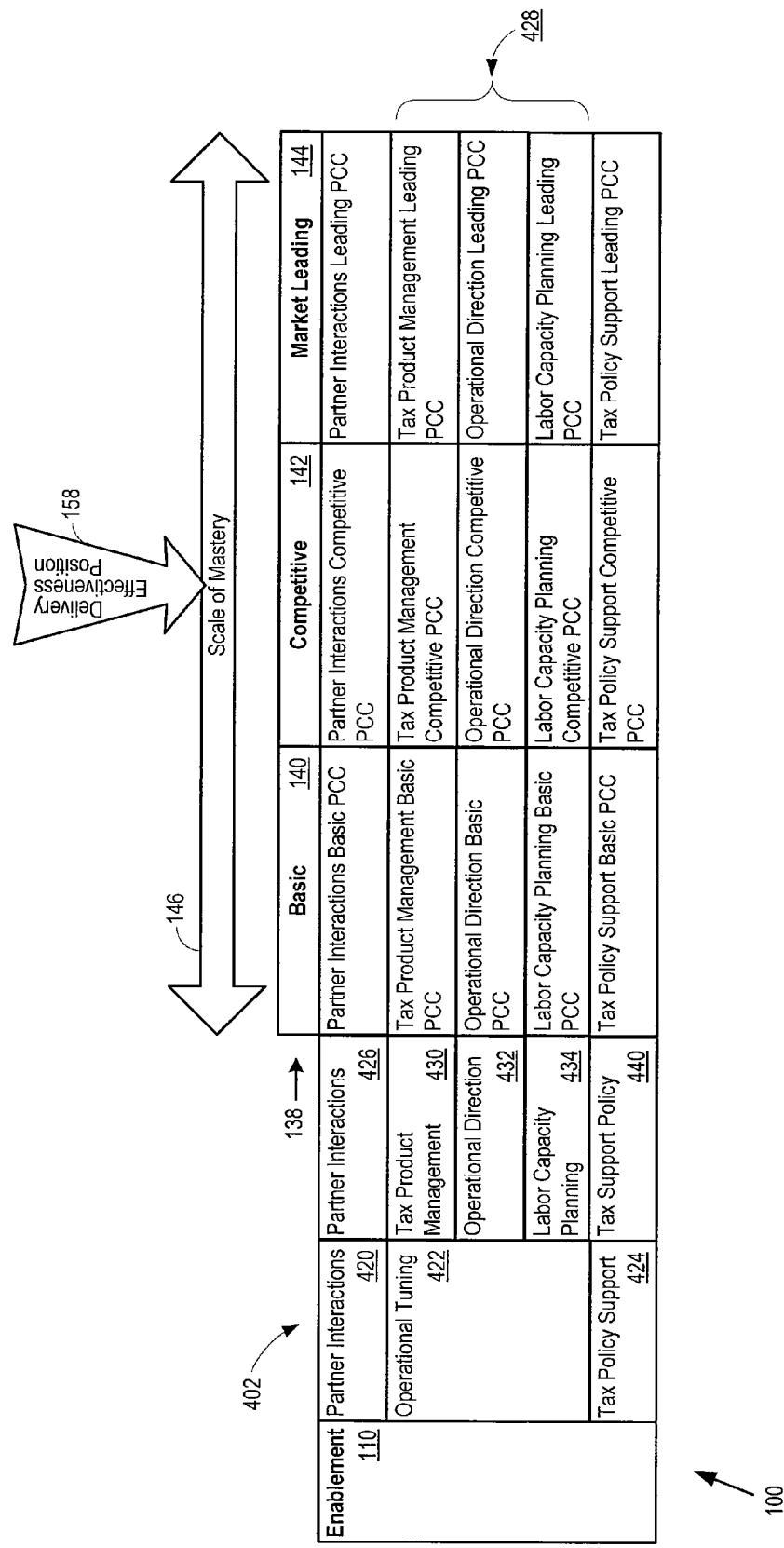
FIG. 4 shows a high performance capability assessment model with enablement capabilities shown.

FIG. 4 shows the enablement platform 110 divided into three sub-platforms 402, namely a partner interactions sub-platform 420, an operational tuning sub-platform 422, and a tax policy support sub-platform 424. The partner interaction sub-platform 420 includes a partner interactions capability 426. The operational tuning sub-platform 422 includes multiple capability areas 428, which include a tax product management capability 430, an operational direction capability 432, and a labor capacity planning capability 434. The tax policy support sub-platform 424 includes a tax policy support capability 440.

Figure 5:
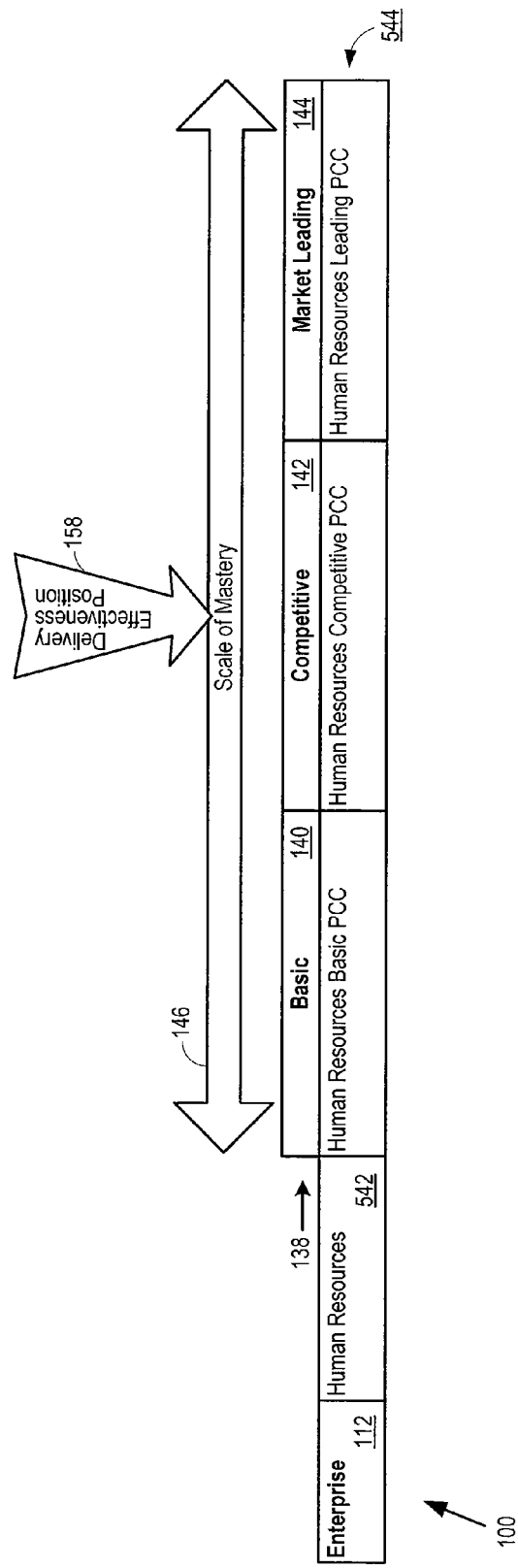
FIG. 5 shows a high performance capability assessment model with enterprise capabilities shown.

FIG. 5 shows the enterprise platform 112, which includes a human resources capability 542, which corresponds to multiple capabilities 544. Additional capabilities may be included.

The following Tables 4-5 provide an explanation of the capabilities and corresponding key assessment areas and performance criteria for each capability within the respective platform. Each capability may include one or more key assessment areas. Each key assessment area may include one or more additional key assessment areas. In other words, an agency capability may include sub-capabilities, and therefore, key assessment areas corresponding to the multiple sub-capabilities. The tables below show specific criteria used to analyze each capability.

The following Tables 4-5 provide an explanation of the capabilities and corresponding key assessment areas and performance capability criteria for each capability within the customer interaction platform 102.

TABLE 4

| | Customer Management |
|---|---|
| Description: | Customer Management includes the development of the customer management and care strategy; the planning of service management, which includes defining the routing of customer inquiries and requests, support standards, and customer specific service levels; providing customer care management, which includes managing and executing the service interaction for both inbound and outbound interactions and providing proactive customer care; specific types of customer service; and measuring service effectiveness. |
| Basic Criteria: | Segmentation and Ownership:<br>Customer base is segmented by some factors: tax types, channels, volume of transactions, and amount of revenue. Separate single ownership is not established for all customer segments (e.g., multiple divisions or individuals have ownership of multiple segments).<br>Personalization:<br>Some channel preferences as communicated by the taxpayer are incorporated (e.g., delivery options for statement of account, publications, and forms; communication preferences for messages).<br>Support and Assistance:<br>Customer satisfaction only polled on ad hoc basis and no process for customer satisfaction improvements.<br>Potential for inconsistent messages, advice and policies.<br>Customer/Partner service initiatives are reactive in nature.<br>Standard assistance programs only offered.<br>All suspended returns worked by agency staff only.<br>Non-holistic view of customer interactions with organization.<br>Performance Transparency:<br>Service benchmarks and results are not published.<br>Human Resources:<br>Hiring profile for customer service personnel is similar to that of other agency personnel.<br>Personnel are not rated or performance ratings are not tied to compensation. |
| Competitive Criteria: | Segmentation and Ownership:<br>Customer base is segmented by traditional factors and current behavior. Ownership is clearly established for high volume, high revenue customers only.<br>Personalization:<br>Different service levels established for customer groups based on |

TABLE 4-continued

| | Customer Management |
|---|---|
| | revenue levels, political factors. Information is pre-filled on line and on paper forms.<br>Support and Assistance:<br>Regular surveys sent to customers with improvement suggestions.<br>Processes used to support consistent messages, advice and policies; however, the processes are not system enforced.<br>Customer information requests are handled dynamically. Customer insight used to shape static customer experience. Focus on relationships and value-add services.<br>Comprehensive assistance programs providing technical assistance, workshops, and specific assistance programs based on customer segmentation.<br>Online ability to allow customers to work suspended returns that are filed electronically.<br>Comprehensive view of taxpayers' business transactions with the organization is available.<br>Performance Transparency:<br>Service benchmarks and results published periodically.<br>Human Resources:<br>Anecdotal agency developed hiring profile is used for customer service personnel.<br>Personnel receive compensation based on performance ratings. |
| Market Leading Criteria: | Segmentation and Ownership:<br>Customer base is segmented dynamically based on market trends, customer care levels, optimization, current behavior, and desired behavior. Continuous improvement program with permanent piloting capability of segments focuses on addressing unmet needs of customer base. Single ownership is established for each segment.<br>Personalization:<br>Message and functionality are personalized to the individual customer based on preferences (e.g., Braille, language, tax agent, channel), customer risk (e.g., more conservative payment plan options, such as a shorter payment plan timeframe, are offered to taxpayers with a lower propensity to honor the payment plan), behavior (e.g., higher down payment required for taxpayer who has defaulted on payment plan in the past,) market segment risk (e.g., electronic payment is required for high revenue taxpayers to increase reliability of timing of payments), and operational direction (e.g., operational direction has been set that focus of department is on increasing voluntary compliance for one segment so a marketing message to improve voluntary compliance is communicated to that segment).<br>Support and Assistance:<br>Customer satisfaction is closely monitored (e.g., time to complete forms is surveyed and communicated) and relationship management procedures are defined. Value contribution is continuously optimized over the full life-time of the customer.<br>System supported processes integrated with workforce training and guidelines are used to ensure consistent messages, advice and policies across all channels.<br>Interactive, closed loop one-stop problem resolution. Proactive and interactive service established based on customer information.<br>Virtual access channels are always available.<br>Highly accessible and frequently updated/created assistance programs driven by economic and customer risk factors are integrated across all channels.<br>Online ability to allow customers to work their suspended returns regardless of incoming channel.<br>Comprehensive log of all taxpayers' business transactions and contacts with the organization is available.<br>Performance Transparency:<br>Service benchmarks and results published to taxpayers so that they can view current service real time.<br>Human Resources:<br>Hiring process for customer service personnel utilizes standard customer service industry hiring profile.<br>Compensation for customer service personnel is directly tied to the customer service representative metrics.<br>Staff is outsourced since it is a non core to revenue function to reduce staffing risk and increase consistency of service. |

TABLE 5

| | Channel Management |
|---|---|
| Description: | Channel Management includes the processes of defining the revenue agency's channel strategy; selecting, developing, and managing the channels; optimizing channel utilization; and monitoring channel performance. Channels include email, text messaging, web, phone, chat, interactive voice response, paper, third party, and walk-in service. |
| Basic Criteria: | Channel Quality:<br>Quality management is reactive and quality management measures are not enforced.<br>Content refreshed reactively for a specific channel. Self-service access channels down during periodic scheduled maintenance. Inconsistent messaging exists across channels.<br>Usability concerns are considered during design of new functionality, but no practices are in place to improve usability such as piloting, usability tests, and refinement.<br>Optimize Channel Usage:<br>Generic mass marketing used to promote channels.<br>Channel Economics:<br>Channels co-exist but are not comprehensively managed and costs associated with certain channels are unknown.<br>Channel Options:<br>Historical channels available. |
| Competitive Criteria: | Channel Quality:<br>Aspects of quality management methodologies are used. Methods and results are not audited for adherence. Measurements are not used or not system supported.<br>Content refreshed reactively across some channels. Self-service access channels down during maintenance due to lack of redundancy of systems. Processes in place for consistent messaging across channels but are not always enforced.<br>Usability design and testing is incorporated into new functionality but is not revisited.<br>Optimize Channel Usage:<br>Marketing targeted to segments of customers to encourage lowest cost channels.<br>Channel Economics:<br>An understanding of costs and benefits is known for some channels.<br>Channel Options:<br>Most revenue transactions can be done via self-service over the web or through third party software. |
| Market Leading Criteria: | Channel Quality:<br>Quality of content is managed and improved proactively and comprehensively using a quality methodology such as CMMI, ISO 9000.<br>Content refreshed continuously and comprehensively across all channels. Virtual self-service access channels available 24X7. System supports consistent messaging across all channels.<br>Usability is improved continuously through user based design, usability testing, piloting with representative customers, and solicitation and incorporating customer feedback.<br>Emphasis is on collaboratively helping taxpayer to meet obligations, not just on filing forms.<br>Optimize Channel Usage:<br>Personalized marketing used during customer contact of undesired channel to suggest optimal channel (e.g., during customer call service rep. suggests use of web services for next contact).<br>Channel Economics:<br>Clear understanding and management of channel economics, including a comprehensive view of costs and benefits across all channels. Channel economics is optimized within the context of Public Sector Value metrics and the cost of delivery of service to those channels.<br>Channel Options:<br>System to system interactions via web services for revenue transactions with partners and taxpayers (e.g., validation rules accessed by tax agent software). Shared services with other revenue agencies accessed via web services (e.g., offset clearing house). Self-service channels available for all revenue functions where benefits outweigh costs. Shared services with other agencies via web services (e.g., one stop business reporting for all government agencies).<br>Private sector customer service innovations are evaluated and employed such as chat and text message (e.g., support on website uses chat functionality to improve efficiency of staff so that staff can work multiple conversations at once; alerts on refunds and payments due sent via text message). |

The following Tables 6-13 provide an explanation of the capabilities and corresponding key assessment areas and performance capability criteria for each capability within the operations platform 104.

TABLE 6

Economic Risk Management

| | |
|---|---|
| Description: | Economic Risk Management includes setting the strategy for economic risk, conducting research of the market conditions as well as mining internal revenue data, developing market segmentations, and the identification of insight into taxpayer trends. |
| Basic Criteria: | Research:<br>Agency allocates resources for research on an as needed basis. Internal data is accessed for research via clunky manual queries.<br>Usage:<br>— |
| Competitive Criteria: | Research:<br>A centralized repository exists for internal and external macro-economic data. Research is done on a whim basis for cost benefit analysis driven research efforts. Research is often duplicated due to lack of organization and education of prior research projects.<br>Usage:<br>— |
| Market Leading Criteria: | Research:<br>Agency has a dedicated integrated research team. A centralized repository is used for internal and external macro-economic data. Methodology and results of research are systematically catalogued for future use.<br>Usage:<br>Identified economic trends and risks factors are inputs into customer risk management, customer segmentation, tax policy, audit campaigns, revenue forecasting, tax product management, education/outreach and partnering strategy. |

TABLE 7

Customer Risk Management

| | |
|---|---|
| Description: | Customer Risk Management includes the development of customer risk strategy; customer risk modeling to support processing, audit and debt/collections analytics and scoring; and segmenting the customers based on risk. |
| Basic Criteria: | Model Definition:<br>No creation of tax risk models. For risk scores, a list of taxpayers is provided to a third party which matches identities and provides a credit score which is not specific to tax and revenue industry.<br>Refresh/Refine:<br>External scores are refreshed to incorporate recent taxpayer behavior in the private sector. Predictive value of credit score for taxpayer behavior never improves.<br>Scoring Usage:<br>Risk scores for some tax segments are used for predicting likelihood of a debt being paid. This information is used to direct staff efforts on which debts to focus effort on. |
| Competitive Criteria: | Model Definition:<br>Agency categorizes taxpayers according to risk, but the agency doesn't develop propensity models with internal data. A third party provides propensity models that were created based on other agencies' tax data. Internal data is applied against this model to score taxpayers.<br>Refresh/Refine:<br>Risk score is refreshed when updated taxpayer and third party data is run against risk models to incorporate recent taxpayer activity. However, a feedback loop doesn't exist to refine the model based on the particular agency's data. Regional, tax law, and cultural differences could make predictive variables that are valid for one agency less valid for another agency.<br>Scoring Usage:<br>Risk score is used for debt collection to predict likelihood of a debt being paid. Risk score is used for audit selection at the high level. Operations performance measurement and staff utilization is not systematically tied to risk scores. Auditors are offered system prioritization based on scores but have additional selection methods. |
| Market Leading Criteria: | Model Definition:<br>Statistical analytic propensity models are used based on internal and/or external empirical tax data rather than using one size fits all scores from external sources (e.g., credit scores). Separate models are created to predict behavior for different products and segments.<br>Refresh/Refine:<br>In addition to the risk score being refreshed when updated taxpayer and third party data is run against the risk model, the model itself is refined as the predictive results are validated and improved by use of historical data, control models, actual results, and Champion/Challenger methods.<br>Scoring Usage:<br>A comprehensive risk integration plan defines end to end use and ownership of risk across the organization: debt collection, audit selection, identity integrity, authentication, customer segmentation, discovery, non-filer location. Staff utilization, marketing and outreach, and operations performance measurement are integrated with risk for optimization. |

TABLE 8

Registration

| | |
|---|---|
| Description: | Registration processes include the receipt of registration information; the creation and maintenance of customer demographic records, license and permit records, customer links and relationships, customer bank details, and customer preferences; and the administration of obligations and entitlements. |
| Basic Criteria: | Processing Efficiency:<br>Client registration is triggered by registration forms provided by client. Taxpayer specifies type of registration.<br>Integrity Activities:<br>Minimal internal data checks (name, address, identifier) to determine if customer is registered and reduce redundancy.<br>Discovery:<br>Identification of discovery cases is based on ad hoc data gathering methods and tips. |
| Competitive Criteria: | Processing Efficiency:<br>Client registration doesn't solely rely on registration forms defining all aspects of registration.<br>Integrity Activities:<br>Use of third party data to cross validate customer identity.<br>Discovery:<br>Agencies are leveraging external data sources, combined with a greater and expanded use of new technologies, data warehousing and data mining, to identify and register non-registrants. |
| Market Leading Criteria: | Processing Efficiency:<br>Client registration is triggered from natural life and business events (e.g., immigration, age). Tax roles. (e.g., taxpayer tax account, third party agent, relationships) are defined by the agency from the overall profile of the client with minimal input from the client. Client should not need to know all tax laws to register correctly.<br>Client is segmented real time so that educational messages and functionality can be provided (e.g., taxpayer is in a segment that is not likely to file correctly so educational message is provided real time while taxpayer is online on likely errors).<br>Integrity Activities:<br>Centralized cross agency/cross government registration clearinghouse to share information, sync identities and realize operational efficiency.<br>Discovery:<br>Comprehensive use of analytic models. Empirical models developed to predict behavior at each taxpayer segment level for candidate propensity to be a valid non-registrant, a case of identity theft, or a fraudulent identity. |

TABLE 9

Forms and Financial Processing

| | |
|---|---|
| Description: | Forms & Financial Processing includes all the processes around setting forms and financial processing strategy; processing returns and forms; processing and depositing payments; working suspended transactions; calculating penalties and interest; evaluating account periods; generating client account statements and refunds; adjusting transactions and maintaining client's account. |
| Basic Criteria: | Service and Outreach:<br>Tax product-centric.<br>Generic mass marketing used to educate taxpayers on common errors and missed credits.<br>Self Assessment of tax liability. Pre-populated returns/notification are generated and issued. Taxpayers file their returns through multiple channels e.g., Paper, E-filing and EDI.<br>Business rules and standards are published so that service providers can duplicate validation and exchange files in the correct format.<br>Call centers and electronic help desks respond to customer inquiries of status.<br>Clients are given assistance to file their return with minimal errors. Assessment is often only finalized after multiple iterations with taxpayer.<br>Emphasis is on zero error returns. Resources are allocated to communicate or correct returns without analysis of cost.<br>Third party information is not used to pre-fill returns.<br>Compliance:<br>Some well known fraud prevention of refund checks is used (e.g., address containing a post office box for a first-time filer claiming a refund check is manually reviewed). |

TABLE 9-continued

| | Forms and Financial Processing |
|---|---|
| | Internal offsets across tax types and periods are applied prior to issue of refunds.<br>Processing Efficiency:<br>Suspended transactions are corrected by tax agency staff.<br>Taxpayers must submit paper amended returns.<br>Within agency payment of obligations is not centralized or consolidated for all channels. |
| Competitive Criteria: | Service and Outreach:<br>Client-centric, integrated client view.<br>Marketing targeted to segments of customers to educate taxpayers on errors common to their segment.<br>Third party data used to automatically audit self assessed returns.<br>Web Services are used to integrate with external service providers to allow them access to forms validation business rules rather than having them duplicate forms validation in their systems.<br>Personalized tax account updates are available online for taxpayers to self-serve in finding out status on transactions.<br>Third party information is used to assist in pre-filling returns but agency doesn't have avenues for the taxpayer to self serve and update information.<br>Compliance:<br>Array of anecdotal reactive checks is used systematically to stop refunds that have proven to be risky historically.<br>Limited offsets to partners<br>Processing Efficiency:<br>Transactions which have been filed online are available to be corrected online.<br>Taxpayers can amend returns which have been filed online.<br>Each contact point provides for payment of all tax obligations within the agency regardless of channels.<br>Business rules treatment is applied the same across all taxpayers for one tax form. |
| Market Leading Criteria: | Service and Outreach:<br>Client-centric, proactive client account management.<br>Probable common errors such as missed credits are identified for taxpayers such that education in the form of personalized messages can be delivered to them at each customer contact.<br>Third party data used to administratively assess tax liability for some tax segments. Use of Bank data to assess tax liability for some segments. Pre-assessed returns/notification are generated and issued. Taxpayer does not need to submit returns. Agency seeks out third party data to expand administrative assessment to more segments.<br>Web Services are exposed to external systems and used to provide extensive audit flags to encourage self correction of high risk returns by taxpayers.<br>Multi-channel, personalized electronic notifications of processing updates (e.g., text messages and emails on due dates, refund status, return suspense, and education).<br>Business Activity Monitoring (BAM) provides identity theft and other fraud detection real time based on statistical anomalies.<br>Clients are given assistance through interactive channels to claim benefits that they are eligible for.<br>Straight through processing - the assessment is finalized interactively with the client in one interaction.<br>Some errors are accepted for high compliance clients. Favor is placed on finalized assessment over perfect assessment if the variation is sufficiently small.<br>Third party information is available to clients to review/update (e.g., bank interest, where the interest should be split between joint account holders).<br>Compliance:<br>Data modeling used to detect fraud patterns.<br>Risk scores used to determine automatic issuance of refunds versus automatic review of period.<br>Apply specific controls to high risk refunds (e.g., check credit report on individual requesting a refund that is high risk to check for identity theft).<br>Intergovernmental Offsets.<br>Multi-government offset clearinghouse.<br>Payment plans offered where taxpayer has a propensity to not be able to pay their liability in full at a single point in time.<br>Processing Efficiency:<br>Regardless of incoming channel, taxpayers are notified of suspended transactions and given the capability to self-correct suspended transactions rather than having agency staff work the suspended items. Incentives are communicated for self correction, such as faster refund times. |

TABLE 9-continued

| Forms and Financial Processing |
|---|
| Regardless of incoming channel, taxpayers can amend returns online.<br>Taxpayer contact with agency provides for payment of other state fees. Taxpayer view of government is personalized and centralized.<br>Business systems leverage the risk models to vary treatment by individual interaction or transaction. (e.g., low risk and normally compliant taxpayers would be less likely to be audited and the return may be systematically corrected). |

TABLE 10

| | Debt Management/Collections |
|---|---|
| Description: | Debt Management/Collections includes the processes of defining treatment strategy, assessing outstanding debt accounts, treating outstanding debt accounts, and resolving debt. |
| Basic Criteria: | Treatment Strategy:<br>Traditional treatment of collectibles (e.g., dollar value driven workflow, anecdotal collectibility decisions, campaigns run on high revenue debt).<br>Third party scoring utilized on a limited basis (e.g., Credit score used to determine collectibility. Collectibility determines routing).<br>Reliance on existing customer demographics based on registration and filing with revenue agency.<br>Treatment Execution:<br>One size fits all application of treatment is offered to all taxpayers in debt collection without regard to follow through patterns.<br>Bank, employment and property data is obtained manually as needed at the time of debt collection.<br>Lien, levy, and wage garnishment activities are fragmented per partner and manual (e.g., third party such as local government representative is contacted manually for property information to place a lien).<br>Field collectors have limited access to taxpayer information while remote.<br>Human Resources:<br>Hiring profile for collections personnel is similar to that of other agency personnel.<br>Personnel are not rated or performance ratings are not tied to compensation.<br>Performance Optimization:<br>Collection efforts are measured at the macro level such as collection levels of different taxes without leading indicators of performance such as what method produced the payment result.<br>Service and Outreach:<br>Marketing surrounding enforcement campaigns is minimal.<br>A full range of collections correspondence exists, but content not optimized.<br>Taxpayer must contact agency representative for any collections related questions or service.<br>Single channel paper correspondence notifies taxpayer of debt.<br>Prevention:<br>— |
| Competitive Criteria: | Treatment Strategy:<br>Risk analytics are not tied to comprehensive receivables management and staff utilization planning. Treatment incorporates some risk analytics (i.e., treatment incorporates some but not all of the following: consideration of dollar value, tax type, and type of caseworker; higher-probability accounts assigned to in-house collectors; lower-probability accounts sent to outside collectors earlier in the collections process, capacity driven staff utilization). The volume of specific treatments is managed to ensure staffing levels are sufficient to manage treatment (e.g., volume of cases included in a campaign is planned based on staff available to handle inbound phone calls that would result).<br>No connection or awareness of debt collection activities' impact on voluntary compliance.<br>Applying internal taxpayer data to propensity models which were based on taxpayer behavior for other agencies.<br>Pursuit involves receipt of updated demographic information from third party data sources.<br>Treatment Execution:<br>Value based payment arrangements are offered to different customer segments based on historical pattern of honoring arrangements (e.g., |

TABLE 10-continued

| Debt Management/Collections |

| | taxpayer has dishonored a prior payment plan so they are required to include a larger down payment).
Bank, employment and property data is obtained automatically via third parties at the time of debt collection.
Some automation exists for performing levies and garnishments.
Field collectors utilize system information remotely of taxpayer obligations that is synched daily. (e.g. laptops where the taxpayer information is downloaded prior to the agent leaving the office).
Human Resources:
Anecdotal agency developed hiring profile is used for collections personnel.
Collections personnel evaluated based on performance (e.g., contacting a targeted number of cases and collection on a certain percentage).
Performance Optimization:
Collections performance assessed by use of leading KPI's.
Service and Outreach:
Enforcement actions are not highly visible, and are only targeted towards taxpayers perceived to pose a high-risk.
Collections correspondence content is optimized per collections industry standards to maximize impact of taxpayer contact with clearly defined consequences.
Taxpayer may make payments and retrieve general compliance information online.
Multi-channel notifications of taxpayer debt increase likelihood of contact.
Prevention:
Processing returned mail timely and using external data sources to obtain the most current addresses. |
| Market Leading Criteria: | Treatment Strategy:
Risk analytics and customer profiling is integrated into comprehensive collections plan which includes treatment strategies and analytic utilization of in-house staff and outside collectors, based on capacity and performance. Campaigns run on different debt statistical segments as part of the collections plan.
Treatments employed by other agencies are considered and piloted for effectiveness (e.g., debtors are subject to publication of their identity and amount, i.e., "name and shame"). Treatment includes denial of government services at a multi-agency level, including the restriction of licenses, placing limits on overseas travel, and restricting government contracts. The revenue agency has multiple offset programs to collect from third parties which may have liabilities to taxpayers.
Treatment decisions take into account and measure effects on voluntary compliance and recidivism of taxpayers re-entering collections.
Propensity models based on internal and external empirical taxpayer data rather than using one size fits all scores from external sources (i.e., credit scores).
Third party software provides skip tracing for location of taxpayers where a valid address is unknown and the likelihood to pay is high and the amount justifies the cost.
Treatment Execution:
Empirical propensity models and scoring of collections behaviors drives payment arrangements and considers outcomes: risk score may impact freedom to self-serve or limit payment plan options.
Automatic, electronic payments may be required from high-risk taxpayer for payment plans.
Bank, employment and property data is proactively stored when provided by the taxpayer for future collection activities.
Third party links are set up to insure fast and reliable data exchange; links are real time.
Lien, levy and wage garnishment activities are fully automated.
Field collectors utilize wireless collection devices for access to real time taxpayer obligations and to credit payments to the account.
Human Resources:
Hiring process for collections personnel utilizes collections industry hiring profile.
Pay for collections personnel is directly tied to the individual collector's collection metrics as well as voluntary compliance metrics for all taxpayers. Quality monitoring and penalties are in place to mitigate unfair collections practices. For example, a collector is paid a percentage of the collected dollars. Calls and complaints are monitored for unfair collections practices.
Performance Optimization:
Dashboard provides administration with a summary view of debt management performance metrics tied to outcomes both over time |

TABLE 10-continued

Debt Management/Collections and at specific points in time. Monitoring of KPI's drives optimization of timing and choice of treatment.
Debt models are validated and improved continuously.
Staff costs are analyzed for outsourcing opportunities.
Centralized collections authority employed for multi-agency debt to reduce cost and increase efficiency of the collections operation.
Service and Outreach:
A variety of highly visible marketing and enforcement actions targets high-risk taxpayers based on segmentation and market insight.
Collections correspondence frequency, content, and channel are driven by assessment of effectiveness based on risk and performance analytics.
Taxpayer can access account information, make payments, and establish payment plans through self-service channels; and may choose to contact collections representative when necessary.
Electronic reminders sent to taxpayers with convenient payment channels (e.g., text message with payment number which accepts electronic payments over the phone).
Automatic payments set up for payment plans.
Prevention:
Tax is collected at the source to reduce likelihood of individuals entering debt collection (e.g., tax withholding on interest or dividend income).
Educate taxpayers when in debt cycle to prevent recidivism.

TABLE 11

Audit

| | |
|---|---|
| Description: | Audit includes audit selection, audit risk profiling, audit case management, conducting audits, and audit assessments. |
| Basic Criteria: | Audit Selections:<br>Audit campaigns are based on "anecdotal" evidence of prior audit selection.<br>Service Efficiency:<br>Taxpayer notified of results of audit. Heavily reliant on paper processing.<br>Field auditors have limited access to taxpayer information while remote.<br>Auditor contact is independent of other agency contact.<br>Prevention:<br>Publications are vague on the compliance actions to be initiated.<br>Performance Optimization:<br>Ad hoc lessons learned from previous audit processing drive future audit functions.<br>Audit effectiveness is measured against prior years.<br>Key process indicators are constrained to tax assessment only.<br>Fairness:<br>—<br>Human Resources:<br>Personnel are not rated or performance ratings are not tied to compensation.<br>No retention plan in place.<br>Partner Interactions:<br>Tax agents and software providers are given limited information regarding audit practices. |
| Competitive Criteria: | Audit Selections:<br>Use of some third party data and warehouse. Limited use of analytic models to define campaigns.<br>Service Efficiency:<br>Taxpayer may retrieve compliance information online.<br>Field auditors utilise system information remotely that is synched to a mobile device daily (e.g., taxpayer information is downloaded to a laptop prior to the agent leaving the office). Prevention:<br>Communication of compliance activities is specified in each collection communication.<br>Performance Optimization:<br>Process exists to capture performance optimization metrics to be used to improve audit functions.<br>Control groups used to verify selection effectiveness.<br>Key process indicators measure tax assessed and efficiency.<br>Fairness:<br>Appeals process is independent of the audit division.<br>Human Resources: |

TABLE 11-continued

Audit

| | |
|---|---|
| | Performance rating of audit personnel is measured only on tax assessed and ratings are tied to compensation.
A retention plan is in place for agency but is not specific to audit personnel.
Partner Interactions:
Workshops are offered to tax agent to instruct them on likely audit targets. Revenue agency provides guidance on common errors to tax agents and software providers. |
| Market Leading Criteria: | Audit Selections:
Comprehensive use of statistical and rule based models for audit selection and campaigns. Statistical models based on third party and internal data are developed to predict behavior at each taxpayer segment level.
Service Efficiency:
Revenue agency notifies taxpayer of likely audit. Taxpayer may update return online to correct discrepancies or remit missing information before an audit is required. Online checklists or step-by-step help guide taxpayer through update process. Online collaborative audits are also used.
Field auditors have real time access to audit accounts due to technology supported by wireless access. Field auditor acts as full-service point of contact for the revenue agency: printing and delivering bills, accepting payments and payment arrangements. Field auditor takes ownership of customer being audited (e.g., for duration of audit, the auditor does follow-up on other outstanding debt and verifies taxpayer is registered and filing for other tax types/heads as applicable).
Prevention:
A published compliance plan outlines the specific risks the revenue agency intends to address and proposed compliance actions to the media and taxpayer base at the start of the tax year.
Agency aggregates results from prior audits and educate taxpayers. Incentives and sanctions exist to encourage disclosure prior to and at the commencement of the audits.
Performance Optimization:
Performance optimization metrics captured and used to improve audit functions and functions across the organization (e.g., forms design, systems, internal communications, channels).
Control groups as well as Champion Challenger method used to optimize audit selection and operations.
Key process indicators measure attributes beyond tax assessed (e.g., increased compliance, reduction in time for audit, quality of audit, brand health, cost effectiveness).
Fairness:
Agency provides taxpayers with an independent and effective oversight of auditing to deal with complaints fairly and efficiently so that everyone can have confidence in the complaints system.
Human Resources:
Performance rating of audit personnel is measured on quality and efficiency of audit and increases in voluntary compliance as measured through surveys. These ratings are tied to compensation.
A comprehensive auditor retention plan is in place. Use of best practices from public and private sector included in plan to compete with private sector for talent.
Partner Interactions:
Revenue agency services are exposed to software providers and used in internet e-filing portal to provide real time notification of likely audits. Rules and exceptions are provided to notify what additional self audit support materials would be required with the return to reduce risk score and minimize return.
Taxpayer lifestyle (e.g., number of offshore accounts) is scored as they file based on third party data. Taxpayer is notified of their probability of the audit. They are given the option of changing their return or providing supporting information and reducing their probability. |

TABLE 12

Discovery and Non-Filer

| | |
|---|---|
| Description: | Discovery & Non-Filer includes the discovery of taxpayers who are not registered or not registered for the correct tax type and/or are not filing with the revenue agency and related programs to bring these taxpayers into compliance. |

TABLE 12-continued

| | Discovery and Non-Filer |
|---|---|
| Basic Criteria: | Data Utilization:<br>Identification of discovery cases is based on ad hoc data gathering methods and tips.<br>Identification of non-filer cases is based on past due periods and does not take incorporate third party data for other filing events.<br>Education:<br>Broad marketing campaigns to encourage compliance with filing and registration. |
| Competitive Criteria: | Data Utilization:<br>Agencies are leveraging external data sources, combined with a greater and expanded use of new technologies, data warehousing and data mining, to identify and register non-filers and non-registrants.<br>Education:<br>Targeted outreach directed to candidates detected through third party data sources. |
| Market Leading Criteria: | Data Utilization:<br>Comprehensive use of analytic and rule based models. Empirical models developed to predict behavior at each taxpayer segment level for candidate propensity to be a valid non-filer or valid non-registrant.<br>Education:<br>Analytics used to determine groups that are unlikely to file or register. Personalized outreach is targeted to taxpayer groups that have a propensity to not file or not register. |

TABLE 13

| | Marketing and Outreach |
|---|---|
| Description: | Marketing & Outreach includes collecting market intelligence, management of marketing strategy, and marketing execution, i.e., the development and delivery of content as well as the execution of marketing by the revenue agency's employees and partners. |
| Basic Criteria: | Strategy:<br>Focus is to try to influence behavior by communicating consequences of non-compliance.<br>Philosophy—Generic broadcast to entire population of taxpayers based on reaction to past problems will result in increased compliance.<br>Market Intelligence:<br>Ad hoc single focus surveys done for particular campaigns or programs. Customer feedback is responded to reactively and not incorporated into education and marketing systematically.<br>Marketing Execution:<br>Basic descriptive models used for basic profiling and simple segmentation. Customers segmented by existing groups (e.g., channels, taxes, business types). Customer base segmented into relatively few and broad groups.<br>Personalization limited to emails (if at all).<br>Lack of integration between marketing and customer service leads to inconsistent messaging. |
| Competitive Criteria: | Strategy:<br>Focus is to educate taxpayers on benefits of compliance and specific tools to enable them to comply.<br>Philosophy—Knowledgeable taxpayers will comply.<br>Market Intelligence:<br>Measurement of customer feedback is planned and organized around agency strategic objectives. Feedback is aggregated for use in marketing and education.<br>Marketing Execution:<br>Segment customers by demographics, geographic areas, aggregated transaction data, channel usage, or attitudes. Segment customers based on historical behavioral trends.<br>Personalization limited to segment-level offers and messages; customer information not fully leveraged.<br>Campaign specific integration of marketing and customer service programs promotes consistent messaging of a particular campaign. |
| Market Leading Criteria: | Strategy:<br>Market science (e.g., customer insight, behavioral analytics) is central to approach. Private industry insight into influencing behavior is used in marketing to increase compliance.<br>Philosophy—A myriad of factors and subtleties which influence behavior must be considered and integrated in order to influence taxpayers to comply. |

TABLE 13-continued

Marketing and Outreach

Market Intelligence:
System supported feedback channels exist for aggregation and analysis of customer contact and behavior. Brand health is a component of measurement.
Marketing Execution:
Segments are based on competitive attributes and are refined and validated frequently using closed loop, repeatable processes.
Extensive use of personalization, both by customer segment and by individual.
Full integration between marketing and customer service programs ensures consistent messaging. Closed loop processes for integration exist for all marketing activities.

The following Tables 14-16 provide a continuing explanation of the capabilities and corresponding key assessment areas and performance capability criteria for each capability within the enablement platform 110.

TABLE 14

Partner Interactions

| | |
|---|---|
| Description: | Partner Interactions involves the processes between the revenue agency and third parties, i.e., tax professionals, software vendors, payroll providers, credit bureaus, business partners, governmental agencies, etc., typically for the purpose of exchanging data and files or for the provision of a service. The included processes are defining partner strategy, managing relationships with partners, contract management, account management, partner service and interaction, and settlement. |
| Basic Criteria: | Partner Selection:<br>No partner selection methodology.<br>Agencies interact with partners as innovations are introduced to them. Sometimes results are not as expected due to shortfalls in investing in the people, technology, or planning to make the initiative work. Spectrum of interactions is limited by inflexible architecture of agency.<br>Wage data gathered from employers for the purpose of auditing tax returns and garnishments.<br>Revenue agency receives regularly updated public records electronically (e.g., birth, death, marriage, divorce, imprisonment records).<br>Exchange return information with service providers.<br>Address validation with postal agency.<br>Third party risk scores.<br>Partner Performance Management:<br>No formal or scheduled feedback takes place with partner. Contact is typically made with a partner only when a problem occurs. |
| Competitive Criteria: | Partner Selection:<br>One-off approach to partner selection utilizes cost-benefit analysis.<br>Partnering opportunities are researched and explored.<br>Agency's interactions with partners are reactive and tactical to address one particular issue.<br>Third party skip tracing<br>Data sharing between government agencies (e.g., tax records, demographics, debts, offsets).<br>Partner Performance Management:<br>Specified feedback is shared with individual suppliers.<br>Feedback is tied directly to corporate goals. |
| Market Leading Criteria: | Partner Selection:<br>Proactive goal driven approach to partner selection, where the end goal (e.g., auto-assessed forms) drives with whom the agency interacts. Partner selection methodology utilizes cost-benefit analysis. Partnering opportunities are researched and explored.<br>Non-strategic services are sourced to third parties.<br>Agency's interactions with partners are tied directly to corporate strategy. Agency has a flexible technical architecture that supports leading edge innovations from private and public sectors.<br>Interactions are focused on refining risk, seeing larger picture of taxpayer, collaboration with private industry, drive self service, and staff utilization.<br>Private party data gathered for risk scoring and audit.<br>Collaboration occurs with software industry to develop offerings.<br>Web services exposed for partners to consume.<br>Information is received from financial institutions for administrative assessments. |

TABLE 14-continued

| Partner Interactions |
|---|
| Partner Performance Management:<br>Service level agreements are built into partner interactions.<br>Certification process for partners for some interactions.<br>Scorecard is provided to partners at set frequency.<br>Continuous communication with partners/suppliers to improve efficiency or service levels and to drive innovations. |

TABLE 15

| | Operations Tuning |
|---|---|
| Description: | Operational Tuning:<br>Tax Product Management includes processes around the operations and processing of each specific tax type/head and the improvements to the efficiency of the tax type/head.<br>Operational Direction refers to setting the focus of the revenue agency at a high level above the tax type level, for a period of time in the near-term, on management objectives and operating policy. It involves setting the focus for risk and compliance programs based on the political climate around the revenue agency and the administration's objectives.<br>Labor Capacity Planning involves forecasting demand for processing and services over time as well as identifying capacity to fulfill the demand based on resources. This includes planning around peaks and valleys, e.g., income tax filing season, periodic business filing due dates, channel planning such as staffing levels required in call centers handling a specific volume of web filing, working suspended returns and payments, collections activities and audits. |
| Basic Criteria: | Tax Product Management (Programs and Projects):<br>Centralized tracking and planning of programs and projects is ad hoc and occurs only as conflicts are noticed.<br>Program and project prioritization relies on the experience and perspective of administrators. Empirical comparison of programs considering cost, benefits, timeline, and resources is not used comprehensively to validate decisions.<br>Operational Direction:<br>Direction of organization is reactively set based on pressures applied to the agency with weight on issues that have affected the agency most recently and most severely.<br>Strategic plans for the future are not in place so that operations do not anticipate future challenges.<br>Little internal or external accountability for operational success against plans.<br>Labor Capacity Planning:<br>Workforce is structured around static job titles and roles.<br>Occasionally staff is temporarily re-assigned to manage capacity (e.g., letter opening during peak filing season; call center support during program resulting in high call volume).<br>Employees are not recognized, rewarded, or trained on advantages of a flexible workforce.<br>Standard working hours apply across the organisation regardless of business demand. |
| Competitive Criteria: | Tax Product Management (Programs and Projects):<br>Programs and projects tracked behind division lines supplemented with coordination with other programs and projects based on lessons learned from prior conflicts. (e.g., technical architecture planned in conjunction with release of system functionality). A centralized view of agency schedule is in place but a designated enterprise steering committee is not in place.<br>Some new programs and projects are quantified with cost benefit analysis. Existing programs and projects are not re-prioritized against new programs.<br>Operational Direction:<br>Direction of organization is proactively set taking into account a broad range of factors. A method is not in place to considering and weighing all possible factors.<br>Strategic plans for the future are specified but operations are not closely tied to the long term strategic plan.<br>Performance rating of B level executives is tied to their successfully achieving objectives.<br>Labor Capacity Planning:<br>Workforce is structured around targeted change of roles for specific programs. Workforce as a whole isn't adaptive to change. Select individuals are recognized as being adaptive and are repeatedly used to address needs. |

TABLE 15-continued

| | Operations Tuning |
|---|---|
| | Select individuals are used because of their innate abilities for change. Employees are encouraged to adapt to change for the good of the organization, but there are no incentives in place to create a culture of change.<br>Static work hours are set per role to accommodate business needs. Work hours may shift to accommodate periodic need. |
| Market Leading Criteria: | Tax Product Management (Programs and Projects):<br>Enterprise wide tracking of programs and projects is used. Centralized view of agency schedule is managed by a designated enterprise steering committee which employs proactive risk management when coordinating events.<br>All programs and projects are quantified from cost benefit analysis and resource availability into scores for prioritization. Existing programs' scores are refined over time with actual results for re-prioritization.<br>Operational Direction:<br>Direction of organization is proactively set after a methodical approach for assessment of factors such as economic and customer risks, brand perceptions, and government oversight influences. Operations are closely aligned with 1-year, 3-year, and 5-year strategy plans.<br>Published plan and tracking is in place to measure progress of operations against goals. B level executives have some compensation tied to achieving objectives within operational direction.<br>Labor Capacity Planning:<br>Workforce is structured for dynamic change to optimize use of latest technology and partnering and to meet the demands on the revenue agency (e.g., temporary workers, outsourced responsibilities, and shared services between agencies are used to manage peak times and workforce shortage). Employee satisfaction and engagement are recognized in approach to staffing.<br>Employees are not entrenched behind division lines but have expectations that their individual talents will be applied across programs to optimize the department. Ability to adapt and thrive in change is a factor in compensation and recognition.<br>Dynamic approach to work days which is driven by business need is used. Staff scheduling is built around peak call and filing times (e.g., flexing traditional break times to accommodate customer tendencies; use of different shifts to overlap peak times; extended work days with employees banking hours for slower periods). |

TABLE 16

| | Tax Support Policy |
|---|---|
| Description: | Tax Policy Support includes revenue forecasting and the analysis, risk evaluation, and support for legislative changes to tax law. |
| Basic Criteria: | Stakeholder Outreach:<br>No process established for communication lines with stakeholders. Communication is on an issue by issue basis as the need is realized. Resources for tax policy support are insufficient in number, operations knowledge, or communications skills to support proactive or reactive communication with resources beyond on an issue by issue basis.<br>Generic mass marketing used to educate taxpayers on revenue policy changes.<br>Impact Analysis:<br>No impact analysis methodology is in place. Analysis of proposed policy is completed as requested by stakeholders. Typically policy is analyzed for its system and operational impacts after it has been enacted. The purpose of the impact analysis is to assess resource needs, plan, and enact changes. |
| Competitive Criteria: | Stakeholder Outreach:<br>Communication lines are established at the highest executive level with policy makers. The mid-level executives that would have insight into operational impacts are not always part of the conversation. Little emphasis on proactive education of impacts with policy makers.<br>Resources for tax policy support are sufficiently staffed with sufficient knowledge for reacting to stakeholder requests. The team does not have the capacity for a thorough process of seeking out and quantifying opportunities for innovation that require legislative approval. |

TABLE 16-continued

Tax Support Policy

| | |
|---|---|
| | Marketing targeted to segments of customers to educate taxpayers on policy changes likely to affect their segment.<br>Impact Analysis:<br>Impact analysis is done on scenarios at the high level by drawing on experts' perspectives. It examines revenue streams and larger economic impacts. Lack of system or sufficient data support limits the ability to model scenarios and examine impacted taxpayer segments. Decisions made on this basis can result in the first indication of impacted taxpayer segments coming after policies are implemented. |
| Market Leading Criteria: | Stakeholder Outreach:<br>Methodical proactive approach is used. Agency sets up lines of communication with legislators, policy makers, and private industry representatives (e.g., new legislator seminars on operations impact of legislation, scheduled periodic stakeholder meetings). Agency uses a quantifiable prioritization of agency driven policy initiatives grounded in cost, benefits, impacts, and likelihood of success. Emphasis is placed on educating stakeholders about potential impacts.<br>Tax policy support is owned by dedicated resources with deep operations knowledge who liaise with stakeholders to maintain communication channels, articulate the point of view of the agency, manage stakeholder requests for research, and are accountable for results.<br>In addition to the agency marketing to segments, personalized messages are delivered to taxpayers at each customer contact on policy changes that are likely to affect that taxpayer.<br>Impact Analysis:<br>Impact analysis is completed in order to provide measurable analysis of proposed scenarios prior to policy implementation to aid in decision making. Impact analysis models are system supported. It is executed by a process which draws on sufficient third party and internal data to compare scenarios' impacts: identifies impacted taxpayer categories, considers operational impacts, and measures impacts on the economy. Risks and responses are determined for the scenarios. Policy changes are modeled systematically and the data examined to quantify scenarios for comparison.<br>Revenue forecasting accuracy and specificity on trends are enhanced via empirical analytic models incorporating internal and third party data. Results are validated against projections for continuous improvement. |

The following Table 17 provides a continuing explanation of the capabilities and corresponding key assessment areas and performance capability criteria for each capability within the enterprise 112.

TABLE 17

Human Resources

| | |
|---|---|
| Description: | Human Resources relates to organizational and employee management and operations, i.e., recruiting, compensation, payroll, performance management, learning. |
| Basic Criteria: | Strategy:<br>Strategy is not defined or continually refined. Approach is around supplying resource needs in response to demand as communicated by divisions on a task order basis. Historical avenues used for HR activities.<br>Internal staff is used for all human resources efforts.<br>Recruiting:<br>Same generic hiring profile is used throughout the agency.<br>No feedback from the performance of new employees is used to improve the recruitment and hiring process. |
| Competitive Criteria: | Strategy:<br>Approach is focused on current trends in meeting demand of the agency. The strategy recognizes that competition exists with private industry for talent. The current best HR practices from private and public sector are employed to attract and retain talent.<br>Third party recruiting is used to supplement recruiting efforts of agency.<br>Recruiting:<br>Anecdotal hiring profile is used for personnel and is specialized for specific skill sets, such as audit, collections, and customer service. |

TABLE 17-continued

Human Resources

| | |
|---|---|
| | The performance of new employees is used to measure the quality of the selection process and identify opportunities for improvement in the recruitment, hiring, and training processes. |
| Market Leading Criteria: | Strategy:<br>Strategy uses the best HR practices from the private and public sector to compete. There is additional focus on long term forecasting of HR supply and demand which identifies geography-specific trends. The agency develops approaches to mitigate risks identified from the analysis of these trends.<br>Currently the single largest Human Resources issue facing revenue agencies around the world is an aging workforce, characterized by a severe shortage in labor, experience, and expertise in general. In the United States, 42% to 64% of the state government workforce will be eligible for retirement by 2015. As this has far-reaching impacts across the revenue agency, the agency must respond by setting its entire strategic focus on this issue. The most acute shortages will affect the areas of audit and information technology.<br>In response to the aging workforce issue, the strategy of human resources places additional emphasis on non-traditional means to facilitate talent development and long term retention. Creative workforce structures are employed such as promoting a culture of semi-retirement.<br>Aspects of Human Resources are analyzed for non strategic functions that can be outsourced. Outsourcing can encompass end to end functions from recruitment, training, retention efforts, communications, etc.<br>Recruiting:<br>Hiring process utilizes standard industry hiring profiles for specific skill sets, such as collections and customer service. The profiles are tailored to the revenue agency's needs for specialized skill sets.<br>An employee referral program exists to recruit highly demanded skill sets and is supported by a reward structure and an aggressive communication plan to promote the program.<br>Recruiting effectiveness is continually measured and improvement opportunities are identified and then incorporated into the recruitment process. |

Figure 6:
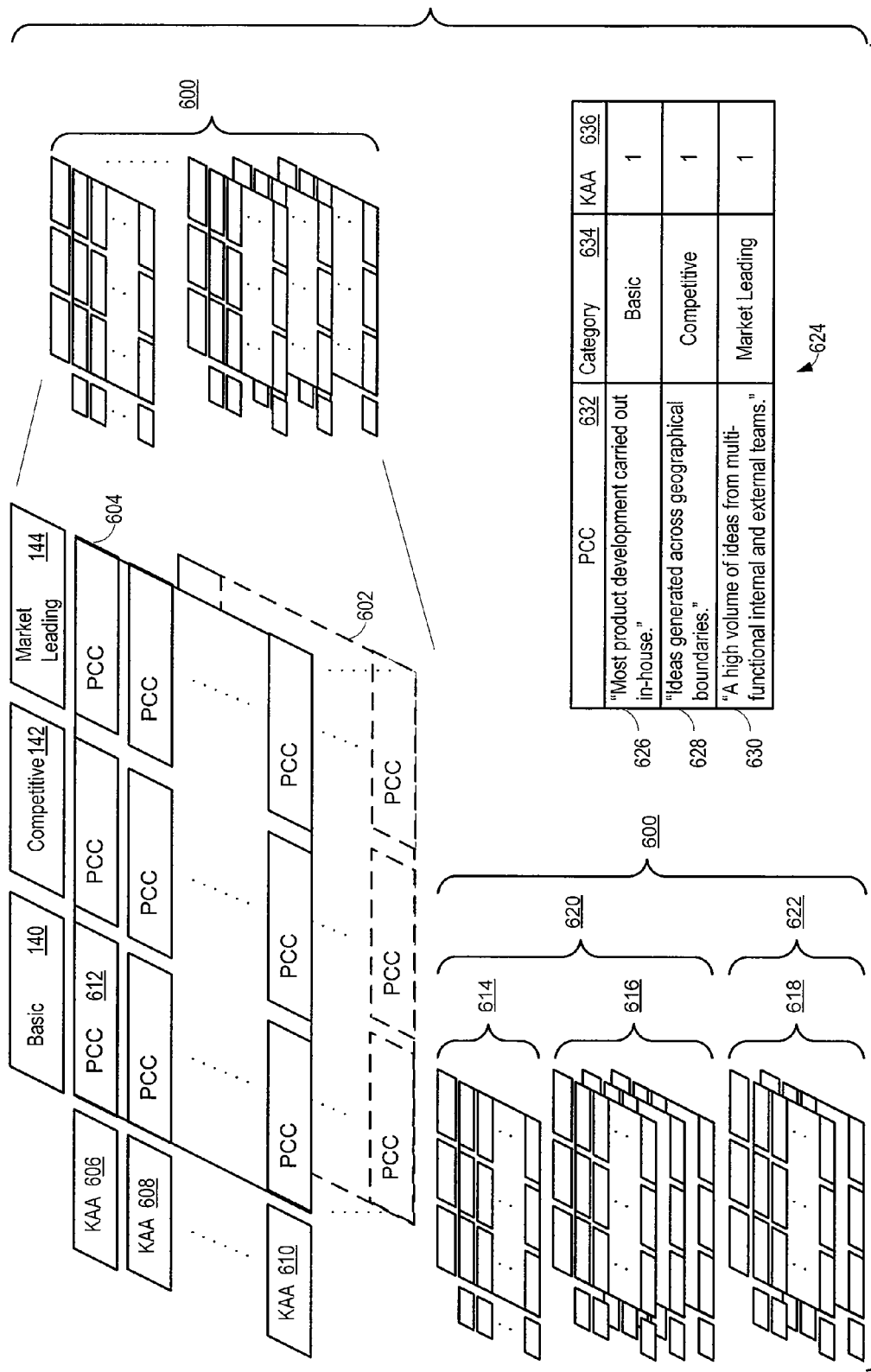
FIG. 6 shows a capability detail pool providing a multidimensional revenue asset industry performance reference set where multiple key assessment performance reference tables are collected and stored.

FIG. 6 shows a multidimensional government revenue industry performance reference set 600 ("reference set 600") that provides a capability detail pool from which the system described below may obtain benchmarking tables for a government revenue agency. The reference set 600 includes multiple key assessment performance reference tables ("reference tables"), two of which are labeled 602 and 604. Each reference table may provide the benchmarking criteria for a specific capability, such as those noted above with respect to FIGS. 2-5.

One dimension of each table may establish the 'Basic' performance level 140 specifying 'Basic' performance assessment criteria, the 'Competitive' performance level 142 specifying 'Competitive' performance assessment criteria, and the 'Market Leading' performance level 144 specifying 'Market Leading' performance assessment criteria. Another dimension of each table may specify one or more key assessment areas (KAAs), several of which are labeled 606, 608, and 610. As noted above, performance criteria, e.g., the PCC 612, populates each key assessment performance reference table to provide benchmark criteria for 'Basic', 'Competitive', and 'Market Leading' characteristics.

The reference set 600 represents the HPCA model 100. Consistent with the HPCA model 100, the reference set 600 may organize multiple reference tables into a hierarchical structure defining discrete changes in granularity. In one implementation, the hierarchical structure includes reference tables, sub-platforms, platforms, and models. FIG. 6 labels three sub-platforms 614, 616, and 618. The reference set 600 may further organize the sub-platforms into platforms, two of which are labeled 620 and 622. Platforms aggregate into the HPCA model 100 and corresponding reference set 600. Additional, different, or fewer levels of granularity may be defined in the HPCA model 100.

The reference set 600 may dynamically populate the reference tables with the most up-to-date performance criteria, for example upon retrieval and presentation by an agency analysis consultant. The performance criteria may be retrieved from a performance capability criteria database or other information source.

FIG. 6 also shows an example of a database implementation 624 of a portion of a reference table. In particular, the database implementation 624 includes records (e.g., the records 626, 628, 630) that establish each PCC 612. In the example shown, each record includes a PCC field 632, a category specifier field 634, and a KAA specifier field 636. Other fields may be provided, such as a reference table assignment field or reference set assignment field. The records categorize each PCC into a specific category (e.g., Basic), into a specific KAA, and, optionally, into a specific reference table in a specific reference set for any particular HPCA model.

Figure 7:
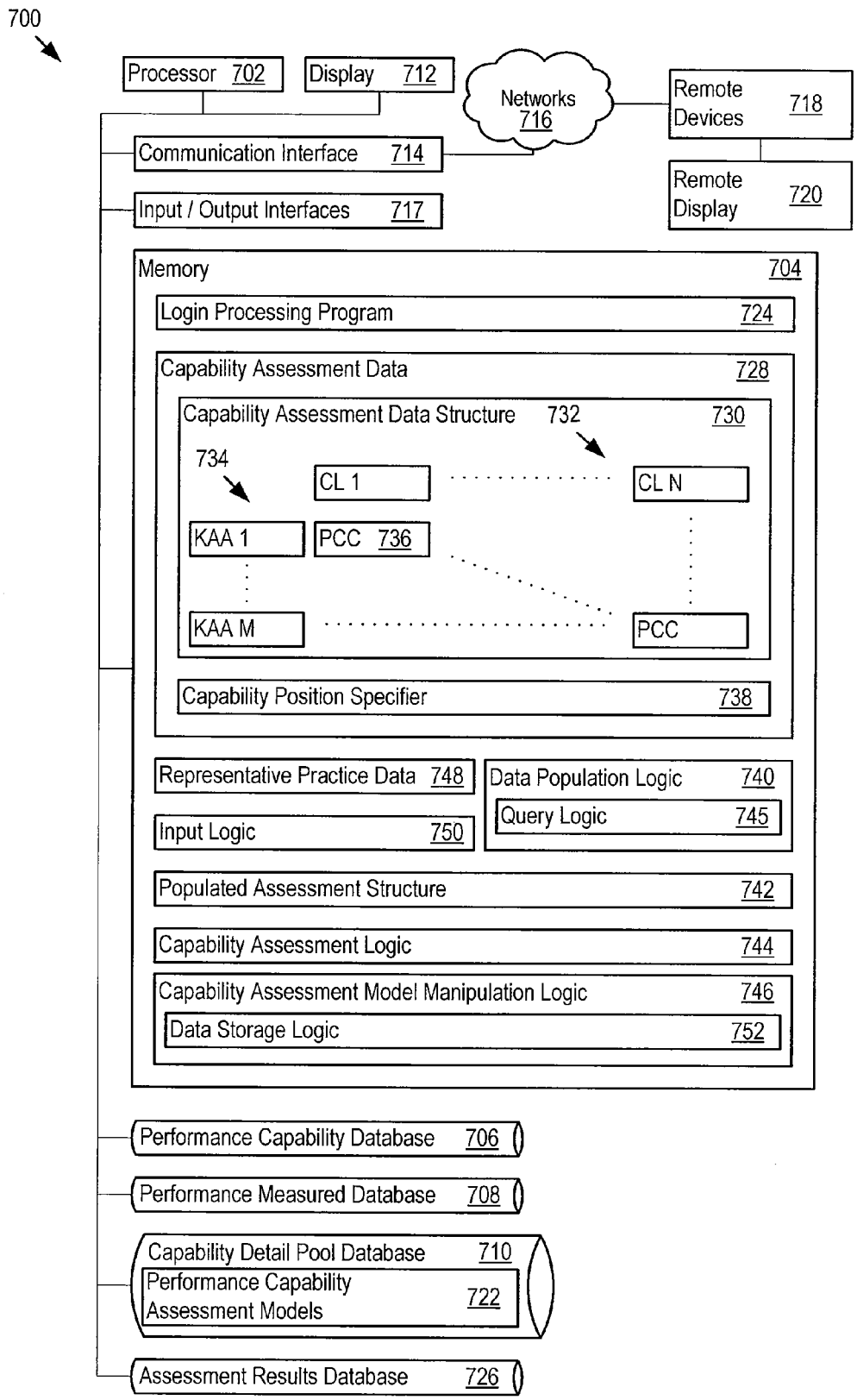
FIG. 7 shows a capability assessment system.

FIG. 7 shows a high-performance capability assessment system ("system") 700. The system 700 includes a processor 702 and a memory 704. Several databases support the operation of the system 700, including a capability performance database 706, a performance measured database 708, a capability detail pool database 710, and an assessment results database 726. The system 700 may include a local display 712 and input/output interfaces 717 (e.g., including a keyboard, mouse, microphone, speakers, or other device), and, through the communication interface 714 and networks 716, may communicate with remote devices 718 and remote displays

720. The networks 716 may be any combination of external networks (e.g., the Internet) and internal networks (e.g., corporate LANs). The displays 712 and 720 may, for example, present performance capability assessment models 722 that the system 700 retrieves from the capability detail pool database 710 for review, modification, and application by process engineers or other individuals. With regard to local access or access by the remote devices 718, the system 700 may include a login processing program 724 to authenticate and/or authorize access to the system 700. To that end, the login processing program 724 may include username/password verification, private/public key encryption, or other validation and data protection capabilities.

In one implementation, the capability performance database 706 stores performance criteria. As will be described in more detail below, the system 700 may populate performance capability assessment models with performance capability criteria suited to any particular platform (e.g., customer interaction platform 102, operations platform 104, enablement platform 110, and enterprise platform 112) and agency capability at one or more capability levels across one or more key assessment areas. The performance measured database 708 may store the determined, measured, or otherwise ascertained characteristics, criteria, and other measured data of a particular key assessment area as representative practice data 748. The representative practice data 748 may be obtained through interviews with agency consultants and industrial engineers, through online questionnaires, through manual or automated analysis of agency data (e.g., year end operating reports), or in other manners. The capability detail pool database 710 stores the capability detail pool 600, which includes pre-defined performance capability assessment models 722. The assessment results database 726 stores determined capability levels for specific capabilities that have been analyzed.

The system 700 facilitates the review, modification, creation, and application of performance capability assessment models. In that role, performance capability assessment model manipulation logic ("manipulation logic") 746 within the system 700 creates, retrieves, and stores capability assessment data 728 in the memory 704. The manipulation logic 746 may establish capability assessment data 728 in the memory 704, including a capability assessment data structure 730 with multiple capability levels ("CL") 732 organized along a scale of mastery dimension, multiple key assessment areas ("KAA") 734 organized along a key factor dimension, and performance criteria ("PCC") 736 that populates the performance capability assessment model 730. The manipulation logic 746 may vary widely in implementation, and, as one example, may include data storage logic 752 that saves data in memory and user interface logic that accepts capability level specifications, key assessment area specifications and performance capability criteria inputs to create new performance capability assessment models, modify existing performance capability assessment models, delete performance capability assessment models, or retrieve performance capability assessment models for review.

In one implementation, the manipulation logic 746 establishes the capability assessment data structure 730 to include a multidimensional revenue industry performance reference set that includes multiple key assessment performance reference tables in which the key assessment performance reference tables include a 'Basic' capability performance level, a 'Competitive' capability performance level, and a 'Market Leading' capability performance level.

The capability assessment data 728 may also include a capability position specifier 738. The capability position specifier 738 may record the capability level along the scale of mastery 146, as determined for any particular capability. Thus, the system 700 may store the performance level in the assessment results database 726 or elsewhere for future retrieval and review.

In one implementation, the data population logic 740 may be a data population program executed by the processor 702 that populates template performance capability assessment models. For example, the data population logic 740 may include input logic 750 that accepts input specifying a capability of interest that indicates a particular performance capability assessment model. The data population logic 740 may include query logic 745 that executes database queries and prompts a user for input to obtain the corresponding performance capability criteria for the capability of interest.

In another implementation, for example, the query logic 745 may receive an input specifying a revenue industry area and a revenue industry key assessment area with the revenue industry area for analysis. The query logic 745 searches the multidimensional revenue industry performance reference set for a matching key assessment performance reference table that matches the revenue industry area and the revenue industry key assessment area, and retrieves the matching key assessment performance reference table.

The data population logic 740 may further include storage logic that adds the retrieved performance capability criteria to the template performance capability assessment model. The data population logic 740 produces populated performance capability assessment structures 742 that may be stored in the capability detail pool database 710.

In addition to the analysis process described above, the system 700 may provide an automated analysis of representative practice data 748 that identifies relevant performance capability criteria and determines the position on the scale of mastery 146 of each key assessment area corresponding to the performance capability criteria for the representative practice data 748. As one example, the system 700 may implement capability assessment logic 744 that includes comparison and/or matching logic that analyzes the representative practice data 748 with respect to performance capability criteria to locate key assessment areas for which the system 700 can determine capability levels to obtain a resultant performance level for each key assessment area.

Furthermore, the capability assessment logic 744 may determine an overall position on the scale of mastery 146 as the capability position specifier 738, for a capability under examination given the knowledge of where the key assessment areas corresponding to the capability under examination fall in each capability level. Thus, for example, the capability assessment logic 744 may determine an overall capability level for a capability corresponding to the capability level for the majority of the key assessment areas, or it may apply a weighted analysis technique to give more emphasis to some key assessment areas than others in determining the overall position on the scale of mastery 146 for a capability. As another example, the capability assessment logic 744 may implement an expert system (e.g., based on a neural network trained on prior determinations) that analyzes the determined characteristics with respect to the performance capability criteria and ascertains where the capability under examination falls along the scale of mastery 146 for each of the key assessment areas, or overall on the scale of mastery.

Figure 8:
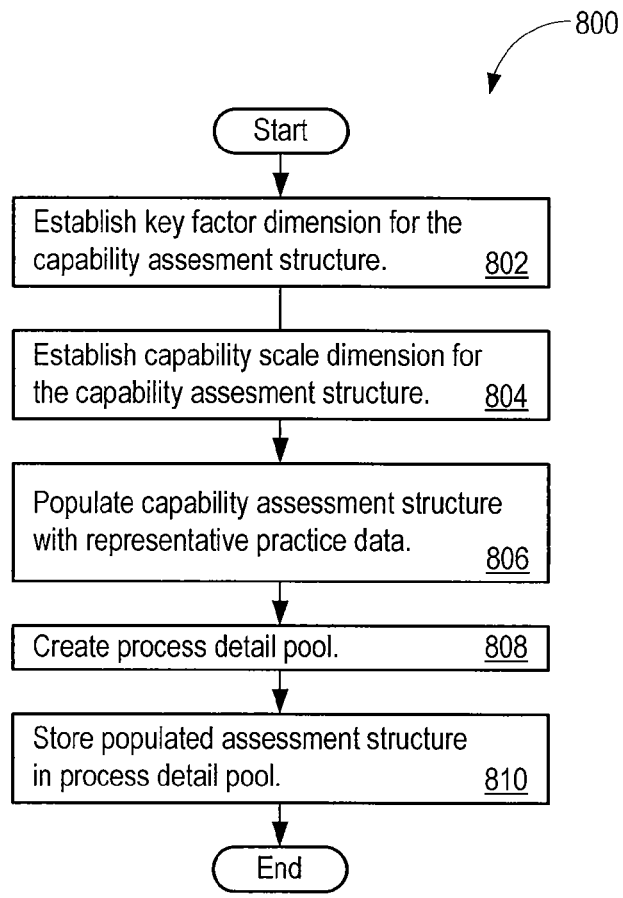
FIG. 8 shows a flow diagram for establishing high-performance capability assessment models.

FIG. 8 shows a flow diagram 800 for creating performance capability assessment models. The performance capability assessment model creator (e.g., the manipulation logic 746) establishes a key factor dimension for the performance capability assessment model (802). The performance capability assessment model creator also establishes a capability scale dimension for the performance capability assessment model (804). The capability scale dimension may define a scale of increasing organizational capability. For example, the structure creator may create the 'Basic' level 140, the 'Competitive' level 142, and the 'Market Leading' level 144. The performance capability assessment model creator also populates the performance capability assessment model with capability performance criteria (806). A capability detail pool 600 may be formed to hold multiple tailored key assessment performance reference tables (808). The performance capability assessment model creator may store the populated assessment structure in the capability detail pool for subsequent retrieval and analysis (810).

Figure 9:
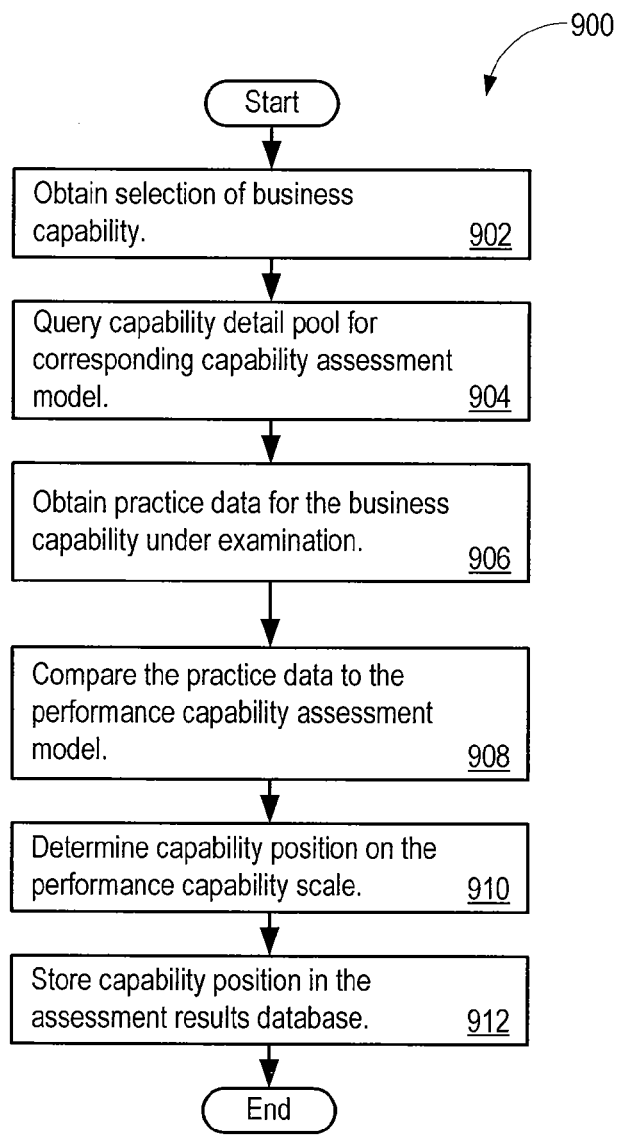
FIG. 9 shows a flow diagram for retrieving and applying high performance capability assessment models.

FIG. 9 shows a flow diagram 900 for retrieving and applying performance capability assessment models. A selection of a capability to be analyzed is obtained (902). In one implementation, the system 700 receives input data that specifies a revenue industry area and a revenue industry key assessment area for analysis. For example, the system 700 may accept input from an agency consultant that specifies a capability for analysis. The system 700 may query the capability detail pool 600 for a corresponding performance capability assessment model (904). The corresponding performance capability assessment model may be pre-defined in the capability detail pool 600, or the data population logic 630 (or other actor) may populate a performance capability assessment model template that the system 700 newly creates, or that the system 700 retrieves from a data store, such as the capability detail pool database 710.

In another example, the system 700 searches the multidimensional revenue industry performance reference set in the capability detail pool 600 for a matching key assessment performance reference table based on the input data that specifies a revenue industry platform and a revenue industry key assessment area. The system 700 retrieves the matching key assessment performance reference table and initiates analysis of the matching key assessment performance reference table to obtain a resultant performance level for the revenue industry key assessment area.

The system 700 obtains representative practice data 748 for the capability under examination in the specific agency under review (906). For example, an agency consultant may interview the agency to determine how the agency currently executes the capability under review. As another example, a representative from the agency may complete a questionnaire, submit agency data for analysis and parameter extraction, or otherwise provide the characteristics of their current capability execution. As a further example, the system 700 may retrieve the representative practice data 748 from a database of previously obtained representative practice data.

The system 700 compares the representative practice data 748 to the performance criteria in the performance capability assessment model (908). For example, an agency consultant may use his or her expertise to arrive at a determination of level for the agency and the capability under examination (910). Alternatively or additionally, the capability assessment logic 744 may perform an automated analysis of the assessment results data in the assessment results database 726 and ascertain the performance level on the scale of mastery 146 (910). The system 700 may store the assessment results, including the determined performance level, for future reference in the assessment results database 726 or other location (912).

Figure 10:
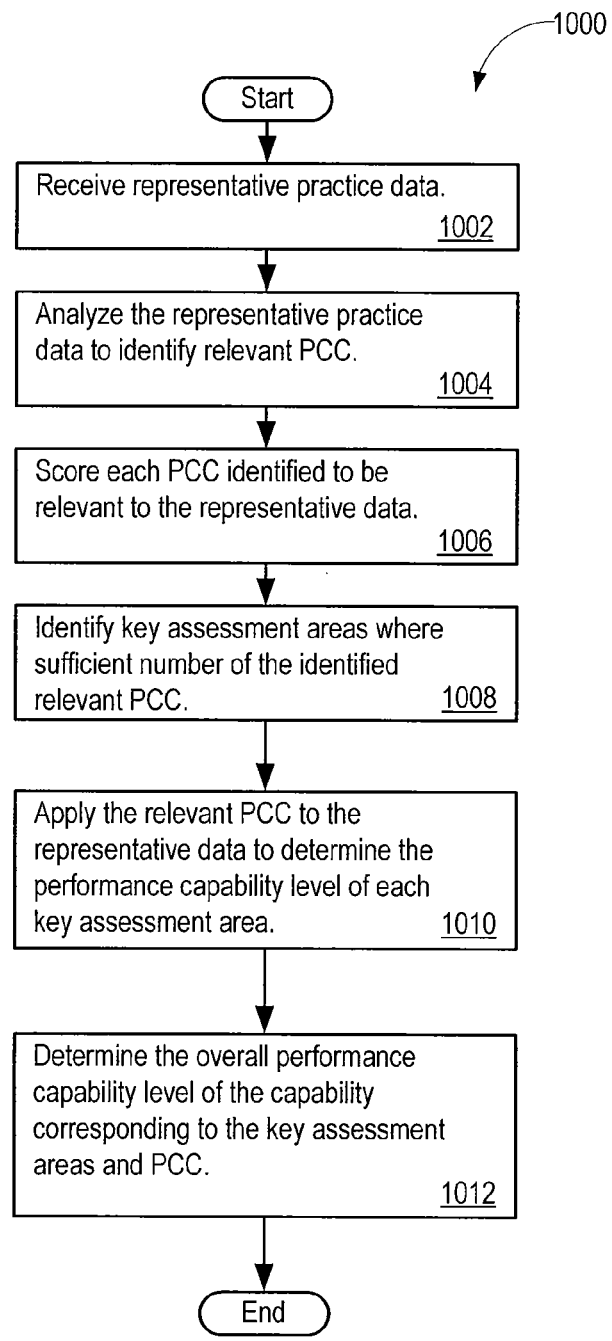
FIG. 10 shows a flow diagram for analyzing representative practice data to determine a revenue asset industry and a revenue asset key assessment area to which the representative practice data applies.

FIG. 10 shows a flow diagram 1000 for analyzing representative practice data 748 to determine a revenue industry and a revenue asset key assessment area to which the representative practice data applies. The system 700 receives representative practice data 748 as input data (1002). The system 700 may receive the representative practice data 748 from a database query performed by the query logic 745 that the query logic executes periodically, when instructed by an operator, and/or automatically against any number of available database sources that store representative practice data 748. The capability assessment logic 744 analyzes the representative practice data 748 to identify performance capability criteria in the capability detail pool 600 that the capability assessment logic 744 determines relevant to the representative practice data 748 (1004). For example, the capability assessment logic 744 may compare and/or match the content of the representative practice data 748 with the performance capability criteria using natural language processing (NLP), text string and/or substring matching, by comparing tags linked to the representative practice data 748 and that specify that any portion of the representative practice data 748 is applicable to a specific PCC, by querying for a manual classification of the representative practice data 748 to a PCC, or other matching technique. The capability assessment logic 744 may score and/or weight a performance capability criteria and compare the score and/or weight to a user specified relevance threshold to rank the relevance of the performance capability criteria to the representative practice data 748 (1006). The user may specify particular terms and/or phrases to search and match between the performance capability criteria and the representative practice data 748, in order to score the performance capability criteria.

The capability assessment logic 744 may determine, based on the number of performance capability criteria that meet or exceed the relevance threshold, that the capability assessment logic 744 has identified a sufficient number of performance capability criteria for a specific key assessment area in order to determine a performance level for the capability as a whole or any key assessment area within the capability (1008). As one example, where at least 51% of the performance capability criteria for a particular key assessment area meet or exceed the relevance threshold, the capability assessment logic 744 applies the performance capability criteria to the representative practice data 748. In another example, the performance capability criteria for a particular key assessment area may be ranked in importance and/or designated as mandatory in order to assess the key assessment area. In the event the capability assessment logic 744 identifies the mandatory performance capability criteria for a key assessment area, the capability assessment logic 744 applies the performance capability criteria to the representative practice data 748.

The capability assessment logic 744 may apply the performance capability criteria meeting or exceeding the relevance threshold to the representative practice data 748 to determine whether any particular PCC is met. Accordingly, as the capability assessment logic 744 analyzes the PCC, the system 700 tracks the best fit of the representative practice data 748 to the PCCs in the key assessment performance reference tables. In other words, the system 700 determines how the representative practice data 748 meets (or does not meet) each PCC, thereby gaining insight into whether the representative practice data 748 is indicative of Basic, Competitive, or Market Leading practices.

The system 700 may also gauge the position on the scale of mastery 146 of each key assessment area corresponding to the performance capability criteria (1010). The capability assessment logic 744 may further determine an overall position on the scale of mastery 146 for a capability (1012). The capability assessment logic 744 may establish that a desired number and/or designated mandatory performance capability criteria for the key assessment areas have been identified as relevant to a capability and sufficient to determine the position on the scale of mastery 146 for the capability. For example, the capability assessment logic 744 may determine an overall performance level for the capability based on the performance level determined for the majority of the key assessment areas. The capability assessment logic 744 may apply a weighted analysis technique to give more emphasis to some key assessment areas than others in determining the overall position on the scale of mastery 146 for the capability. Although selected aspects, features, or components of the implementations are depicted as being stored in computer-readable memories (e.g., as computer-executable instructions or performance capability assessment models), all or part of the systems and structures may be stored on, distributed across, or read from other computer-readable media. The computer-readable media may include, for example, secondary storage devices such as hard disks, floppy disks, and CD-ROMs; a signal, such as a signal received from a network or received at an antenna; or other forms of memory, including ROM or RAM, either currently known or later developed.

Various implementations of the system 700 may include additional or different components. A processor may be implemented as a microprocessor, a microcontroller, a DSP, an application specific integrated circuit (ASIC), discrete logic, or a combination of other types of circuits or logic. Similarly, memories may be DRAM, SRAM, Flash or any other type of memory. The processing capability of the system may be distributed among multiple system components, such as among multiple processors and memories, optionally including multiple distributed processing systems. Parameters, databases, and other data structures may be separately stored and managed, may be incorporated into a single memory or database, may be logically and physically organized in many different ways, and may be implemented in many ways, including data structures such as linked lists, hash tables, or implicit storage mechanisms. Programs may be combined or split among multiple programs, or distributed across several memories and processors.

The HPCA 100 model provides unexpectedly good results for a performance capability assessment model, particularly in the revenue asset industry. In particular, the combinations of key assessment areas and particular assessment criteria of the HPCA model, including the criteria noted in Tables 4-17 above, provide significant advantages over other assessment models. The unexpectedly good results include clearly identifying and delineating from among multiple related complex processes the specific processes to improve, and how to improve the process and identifying concrete and measurable improvement goals.

While various embodiments of the invention have been described, it will be apparent to those of ordinary skill in the art that many more embodiments and implementations are possible within the scope of the invention. Accordingly, the invention is not to be restricted except in light of the attached claims and their equivalents.

We claim:

1. A computer-implemented method for high performance capability assessment of a revenue asset agency, comprising:
　defining, by a processor coupled to a machine-readable memory, a multidimensional revenue asset industry performance reference set stored in the memory and comprising multiple key assessment performance reference tables, at least one key assessment performance reference table further defining a customer interaction platform including:
　　a 'Basic' performance level specifying 'Basic' performance assessment criteria;
　　a 'Competitive' performance level specifying 'Competitive' performance assessment criteria;
　　a 'Market Leading' performance level specifying 'Market Leading' performance assessment criteria;
　establishing customer management performance assessment criteria,
　　wherein the 'Basic' performance assessment criteria includes a first criteria where customer base is segmented by factors: tax types, channels, volume of transactions, and amount of revenue;
　　wherein the 'Competitive' performance assessment criteria includes a first criteria where a customer base is segmented by traditional factors and current behavior; and
　　wherein the 'Market Leading' performance assessment criteria includes a first criteria where the customer base is segmented dynamically based on market trends, customer care levels, optimization, current behavior, and desired behavior;
　receiving, through a communication interface coupled to the processor, an input specifying a revenue industry area and a revenue industry key assessment area (KAA) with the revenue industry area for analysis;
　searching, by the processor, the multidimensional revenue asset industry performance reference set for a matching key assessment performance reference table that matches the revenue industry area and the revenue industry key assessment area (KAA);
　retrieving, by the processor, the matching key assessment performance reference table;
　analyzing, by the processor, the matching key assessment performance reference table; and
　obtaining, by the processor, a resultant performance level for the revenue industry key assessment area (KAA).

2. A computer-implemented method for high performance capability assessment of a revenue asset agency, comprising:
　defining, by a processor coupled to a machine-readable memory, a multidimensional revenue asset industry performance reference set stored in the memory and comprising multiple key assessment performance reference tables, at least one key assessment performance reference table further defining a customer interaction platform including:
　　a 'Basic' performance level specifying 'Basic' performance assessment criteria;
　　a 'Competitive' performance level specifying 'Competitive' performance assessment criteria;
　　a 'Market Leading' performance level specifying 'Market Leading' performance assessment criteria;
　establishing channel management performance assessment criteria,
　　wherein the 'Basic' performance assessment criteria includes a first criteria where quality management is reactive and quality management measures are not enforced;
　　wherein the 'Competitive' performance assessment criteria includes a first criteria where methods and results are not audited for adherence; and
　　wherein the 'Market Leading' performance assessment criteria includes a first criteria where quality of content is managed and improved proactively and comprehensively using a quality methodology;
　receiving, through a communication interface coupled to the processor, an input specifying a revenue industry area and a revenue industry key assessment area (KAA) with the revenue industry area for analysis;

searching, by the processor, the multidimensional revenue asset industry performance reference set for a matching key assessment performance reference table that matches the revenue industry area and the revenue industry key assessment area (KAA);

retrieving, by the processor, the matching key assessment performance reference table;

analyzing, by the processor, the matching key assessment performance reference table; and obtaining, by the processor, a resultant performance level for the revenue industry key assessment area (KAA).

3. A computer-implemented method for high performance capability assessment of a revenue asset agency, comprising:

defining, by a processor coupled to a machine-readable memory, a multidimensional revenue asset industry performance reference set stored in the memory and comprising multiple key assessment performance reference tables, at least one key assessment performance reference table defining an operations platform including:

a 'Basic' performance level specifying 'Basic' performance assessment criteria;

a 'Competitive' performance level specifying 'Competitive' performance assessment criteria;

a 'Market Leading' performance level specifying 'Market Leading' performance assessment criteria;

establishing economic risk management performance assessment criteria, wherein the 'Basic' performance assessment criteria includes a first criteria where agency allocates resources for research on an as needed basis;

wherein the 'Competitive' performance assessment criteria includes a first criteria where a centralized repository exists for internal and external macro-economic data; and wherein the 'Market Leading' performance assessment criteria includes a first criteria where agency has a dedicated integrated research team and a centralized repository is used for internal and external macro-economic data;

receiving, through a communication interface coupled to the processor, an input specifying a revenue industry area and a revenue industry key assessment area (KAA) with the revenue industry area for analysis;

searching, by the processor, the multidimensional revenue asset industry performance reference set for a matching key assessment performance reference table that matches the revenue industry area and the revenue industry key assessment area (KAA);

retrieving, by the processor, the matching key assessment performance reference table;

analyzing, by the processor, the matching key assessment performance reference table; and obtaining, by the processor, a resultant performance level for the revenue industry key assessment area.

4. A computer-implemented method for high performance capability assessment of a revenue asset agency, comprising:

defining, by a processor coupled to a machine-readable memory, a multidimensional revenue asset industry performance reference set stored in the memory and comprising multiple key assessment performance reference tables, at least one key assessment performance reference table defining an operations platform including:

a 'Basic' performance level specifying 'Basic' performance assessment criteria;

a 'Competitive' performance level specifying 'Competitive' performance assessment criteria;

a 'Market Leading' performance level specifying 'Market Leading' performance assessment criteria;

establishing customer risk management performance assessment criteria, wherein the 'Basic' performance assessment criteria includes a first criteria where no creation of tax risk models and for risk scores, a list of taxpayers is provided to a third party which matches identities and provides a credit score which is not specific to tax and revenue industry;

wherein the 'Competitive' performance assessment criteria includes a first criteria where agency categorizes taxpayers according to risk, but the agency doesn't develop propensity models with internal data; and wherein the 'Market Leading' performance assessment criteria includes a first criteria where statistical analytic propensity models are used based on internal and/or external empirical tax data rather than using one size fits all scores from external sources;

receiving, through a communication interface coupled to the processor, an input specifying a revenue industry area and a revenue industry key assessment area (KAA) with the revenue industry area for analysis;

searching, by the processor, the multidimensional revenue asset industry performance reference set for a matching key assessment performance reference table that matches the revenue industry area and the revenue industry key assessment area (KAA);

retrieving, by the processor, the matching key assessment performance reference table;

analyzing, by the processor, the matching key assessment performance reference table; and obtaining, by the processor, a resultant performance level for the revenue industry key assessment area.

5. A computer-implemented method for high performance capability assessment of a revenue asset agency, comprising:

defining, by a processor coupled to a machine-readable memory, a multidimensional revenue asset industry performance reference set stored in the memory and comprising multiple key assessment performance reference tables, at least one key assessment performance reference table defining an operations platform including:

a 'Basic' performance level specifying 'Basic' performance assessment criteria;

a 'Competitive' performance level specifying 'Competitive' performance assessment criteria;

a 'Market Leading' performance level specifying 'Market Leading' performance assessment criteria;

establishing registration performance assessment criteria, wherein the 'Basic' performance assessment criteria includes a first criteria where client registration is triggered by registration forms provided by client;

wherein the 'Competitive' performance assessment criteria includes a first criteria where client registration doesn't solely rely on registration forms defining all aspects of registration;

wherein the 'Market Leading' performance assessment criteria includes a first criteria where registration is triggered from natural life and agency events (immigration, age);

receiving, through a communication interface coupled to the processor, an input specifying a revenue industry area and a revenue industry key assessment area (KAA) with the revenue industry area for analysis;

searching, by the processor, the multidimensional revenue asset industry performance reference set for a matching key assessment performance reference table that matches the revenue industry area and the revenue industry key assessment area (KAA);
retrieving, by the processor, the matching key assessment performance reference table;
analyzing, by the processor, the matching key assessment performance reference table; and
obtaining, by the processor, a resultant performance level for the revenue industry key assessment area.

6. The computer-implemented method of claim 3, further including establishing forms and financial processing performance assessment criteria.

7. The computer-implemented method of claim 3, further including establishing debt management and collections performance assessment criteria.

8. The computer-implemented method of claim 3, further including establishing audit performance assessment criteria.

9. The computer-implemented method of claim 3, further including establishing discovery and non-filer performance assessment criteria.

10. The computer-implemented method of claim 3, further including establishing marketing and outreach performance assessment criteria.

11. A computer-implemented method for high performance capability assessment of a revenue asset agency, comprising:
defining, by a processor coupled to a machine-readable memory, a multidimensional revenue industry performance reference set stored in memory and comprising multiple key assessment performance reference tables, at least one key assessment performance reference table defining an enablement platform including:
a 'Basic' performance level specifying 'Basic' performance assessment criteria;
a 'Competitive' performance level specifying 'Competitive' performance assessment criteria;
a 'Market Leading' performance level specifying 'Market Leading' performance assessment criteria;
establishing partner interactions performance assessment criteria,
wherein the 'Basic' performance assessment criteria includes a first criteria: where no partner selection methodology exists;
wherein the 'Competitive' performance assessment criteria includes a first criteria where a one-off approach to partner selection utilizes cost-benefit analysis; and
wherein the 'Market Leading' performance assessment criteria includes a first criteria where a proactive goal driven approach to partner selection, and where the end goal (auto-assessed forms) drives with whom the agency interacts;
receiving an input specifying a revenue industry area and a revenue industry key assessment area (KAA) with the revenue industry area for analysis;
searching, by the processor, the multidimensional revenue industry performance reference set for a matching key assessment performance reference table that matches the revenue industry area and the revenue industry key assessment area;
retrieving, by the processor, the matching key assessment performance reference table;
analyzing, by the processor, the matching key assessment performance reference table; and
obtaining, by the processor, a resultant performance level for the revenue industry key assessment area.

12. A computer-implemented method for high performance capability assessment of a revenue asset agency, comprising:
defining, by a processor coupled to a machine-readable memory, a multidimensional revenue industry performance reference set stored in memory and comprising multiple key assessment performance reference tables, at least one key assessment performance reference table defining an enablement platform including:
a 'Basic' performance level specifying 'Basic' performance assessment criteria;
a 'Competitive' performance level specifying 'Competitive' performance assessment criteria;
a 'Market Leading' performance level specifying 'Market Leading' performance assessment criteria;
establishing tax product management performance assessment criteria,
wherein the 'Basic' performance assessment criteria includes a first criteria where centralized tracking and planning of programs and projects is ad hoc and occurs only as conflicts are noticed;
wherein the 'Competitive' performance assessment criteria includes a first criteria where programs and projects tracked behind division lines supplemented with coordination with other programs and projects based on lessons learned from prior conflicts; and
wherein the 'Market Leading' performance assessment criteria includes a first criteria where enterprise wide tracking of programs and projects is used;
receiving an input specifying a revenue industry area and a revenue industry key assessment area (KAA) with the revenue industry area for analysis;
searching, by the processor, the multidimensional revenue industry performance reference set for a matching key assessment performance reference table that matches the revenue industry area and the revenue industry key assessment area;
retrieving, by the processor, the matching key assessment performance reference table;
analyzing, by the processor, the matching key assessment performance reference table; and
obtaining, by the processor, a resultant performance level for the revenue industry key assessment area.

13. A computer-implemented method for high performance capability assessment of a revenue asset agency, comprising:
defining, by a processor coupled to a machine-readable memory, a multidimensional revenue industry performance reference set stored in memory and comprising multiple key assessment performance reference tables, at least one key assessment performance reference table defining an enablement platform including:
a 'Basic' performance level specifying 'Basic' performance assessment criteria;
a 'Competitive' performance level specifying 'Competitive' performance assessment criteria;
a 'Market Leading' performance level specifying 'Market Leading' performance assessment criteria;
establishing operational direction performance assessment criteria,
wherein the 'Basic' performance assessment criteria includes a first criteria where direction of organization is reactively set based on pressures applied to the agency with weight on issues that have affected the agency most recently and most severely;
wherein the 'Competitive' performance assessment criteria includes a first criteria where direction of organization is proactively set taking into account a broad range of factors; and wherein the 'Market Leading' performance assessment criteria includes a first criteria where direction of organization is proactively set after a methodical approach for assessment of factors such as economic and customer risks, brand perceptions, and government oversight influences;

receiving an input specifying a revenue industry area and a revenue industry key assessment area (KAA) with the revenue industry area for analysis;

searching, by the processor, the multidimensional revenue industry performance reference set for a matching key assessment performance reference table that matches the revenue industry area and the revenue industry key assessment area;

retrieving, by the processor, the matching key assessment performance reference table;

analyzing, by the processor, the matching key assessment performance reference table; and obtaining, by the processor, a resultant performance level for the revenue industry key assessment area.

14. The computer-implemented method of claim 11, further including establishing labor capacity planning performance assessment criteria.

15. The computer-implemented method of claim 11, further including establishing tax support policy performance assessment criteria.

* * * * *